(12) United States Patent
Yasukawa et al.

(10) Patent No.: US 8,070,238 B2
(45) Date of Patent: Dec. 6, 2011

(54) ELECTRO MECHANICAL BRAKE, CONTROL DEVICE

(75) Inventors: Daisuke Yasukawa, Hitachinaka (JP);
Kazumoto Sano, Chuo (JP)

(73) Assignee: Hitachi, Ltd., Tokyo (JP)

( * ) Notice: Subject to any disclaimer, the term of this patent is extended or adjusted under 35 U.S.C. 154(b) by 673 days.

(21) Appl. No.: 11/695,335

(22) Filed: Apr. 2, 2007

(65) Prior Publication Data
US 2007/0228824 A1   Oct. 4, 2007

(30) Foreign Application Priority Data
Apr. 3, 2006  (JP) ................................. 2006-101357

(51) Int. Cl.
*B60T 13/00*  (2006.01)
(52) U.S. Cl. ........................................................... 303/20
(58) Field of Classification Search ..................... 303/20;
188/71.1–73.47, 264 A
See application file for complete search history.

(56) References Cited

U.S. PATENT DOCUMENTS

| | | | | |
|---|---|---|---|---|
| 5,023,824 A | * | 6/1991 | Chadima et al. | 361/679.09 |
| 5,050,711 A | * | 9/1991 | Sawato | 188/164 |
| 5,533,425 A | * | 7/1996 | Mabee | 74/661 |
| 5,603,395 A | * | 2/1997 | Mabee | 192/70.13 |
| 5,915,504 A | | 6/1999 | Doericht | |
| 6,118,247 A | * | 9/2000 | Obayashi et al. | 318/712 |
| 7,610,998 B2 | * | 11/2009 | Baumgartner et al. | 188/72.9 |
| 2003/0038482 A1 | * | 2/2003 | Dubus et al. | 290/36 R |
| 2003/0083797 A1 | * | 5/2003 | Yokoyama et al. | 701/70 |
| 2005/0018390 A1 | * | 1/2005 | Sanada et al. | 361/679 |
| 2006/0180365 A1 | | 8/2006 | Innami et al. | |

FOREIGN PATENT DOCUMENTS

| | | |
|---|---|---|
| DE | 196 15 186 C1 | 8/1997 |
| DE | 100 16 162 A1 | 3/2001 |
| EP | 1 308 321 A1 | 5/2003 |
| EP | 1 840 405 A1 | 10/2007 |
| JP | 01106761 A * | 4/1989 |
| JP | 2003-137081 A | 5/2003 |
| JP | 2005-069268 A | 3/2005 |

OTHER PUBLICATIONS

European Search Report dated Mar. 11, 2009 (Five (5) pages).

* cited by examiner

*Primary Examiner* — Robert Siconolfi
*Assistant Examiner* — Stephen Bowes
(74) *Attorney, Agent, or Firm* — Crowell & Moring LLP

(57) ABSTRACT

An electro mechanical brake apparatus is provided, in which a counter-measure for the heat of the driving circuit is much improved when configured to be integrated with an electric circuit. An electric circuit portion is provided by sandwiching a motor with brake pads, and a power module is provided so that a heat dissipating surface is opposed to the inner surface of the metallic outer case of the electric circuit portion, and a control circuit board is disposed at the motor side for the power module.

3 Claims, 15 Drawing Sheets

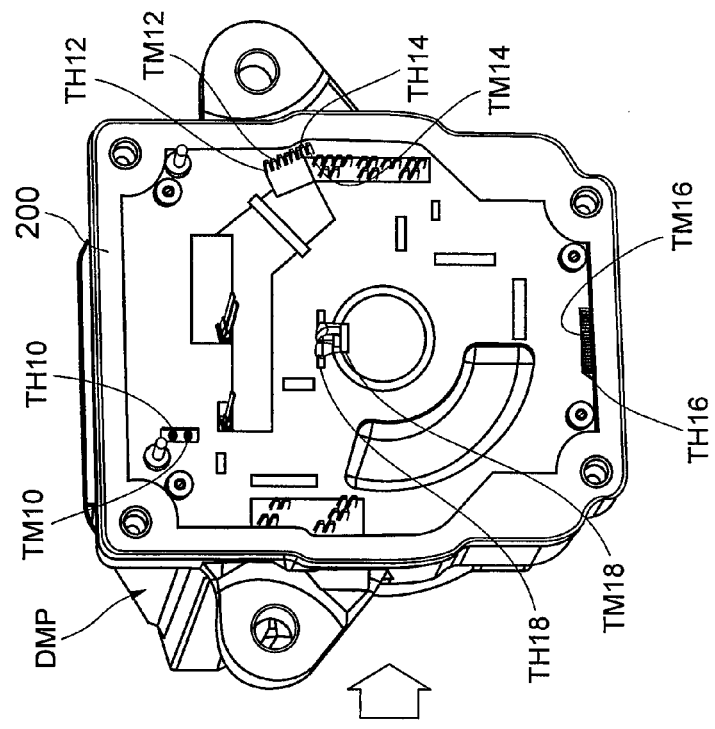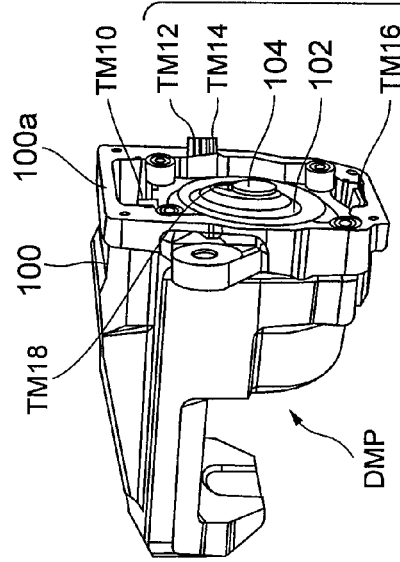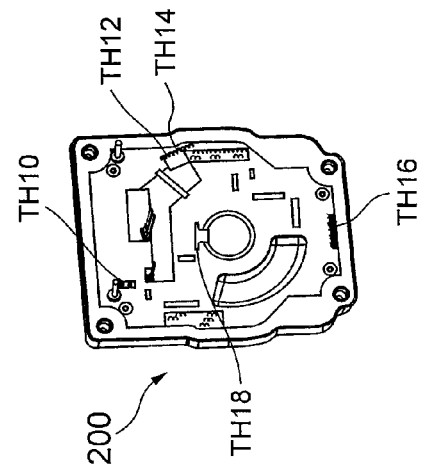

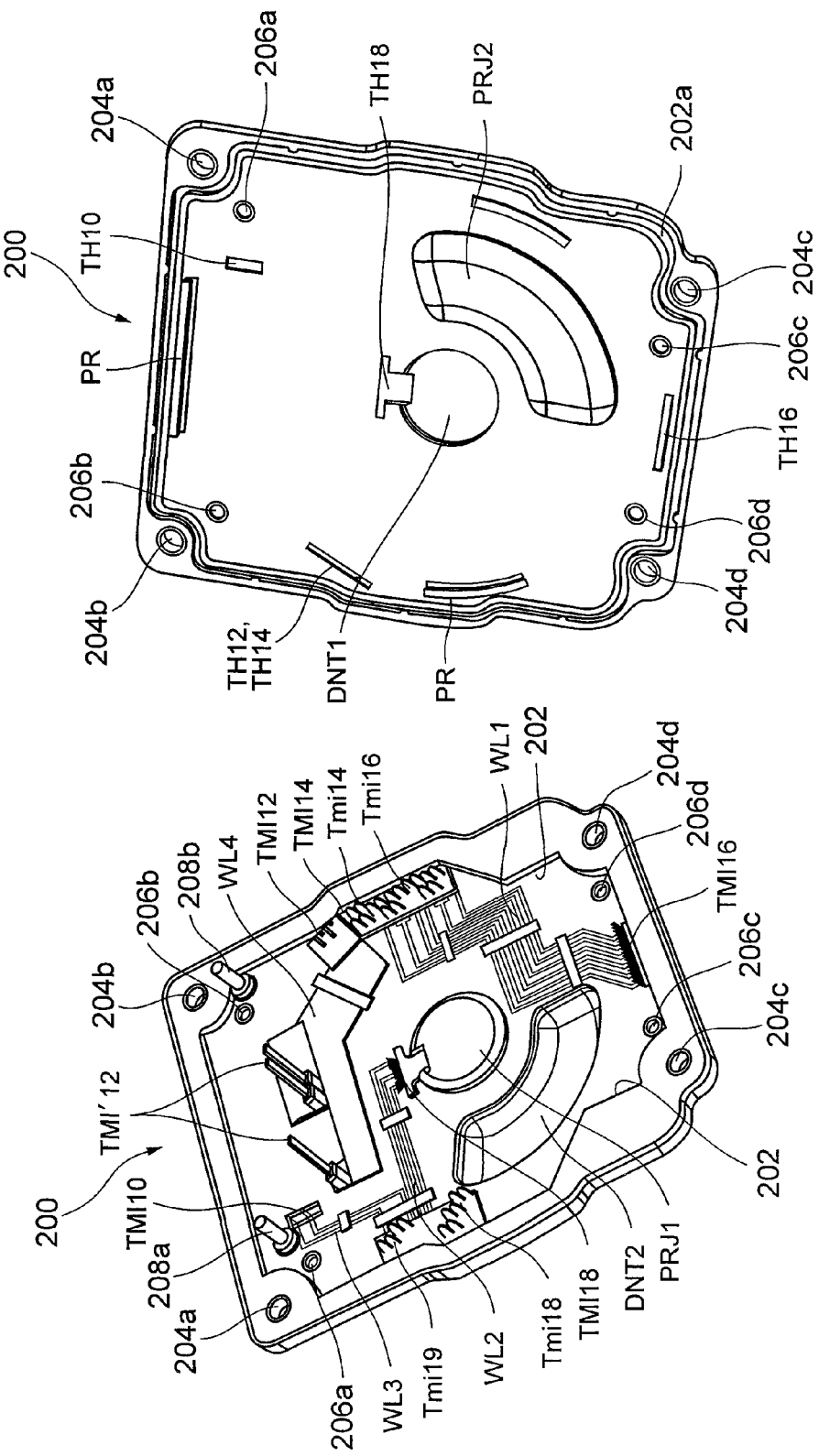

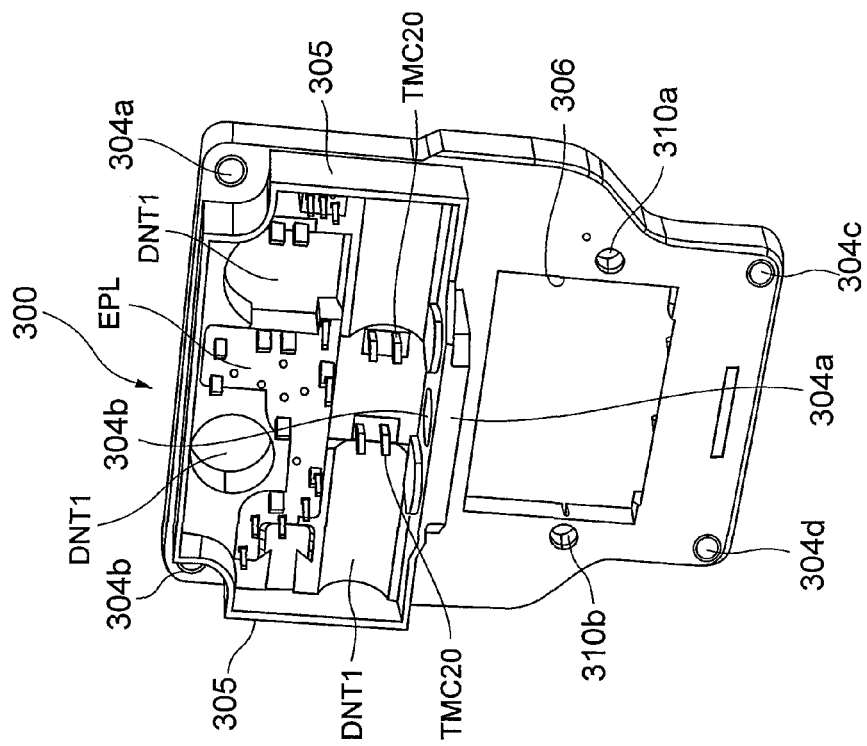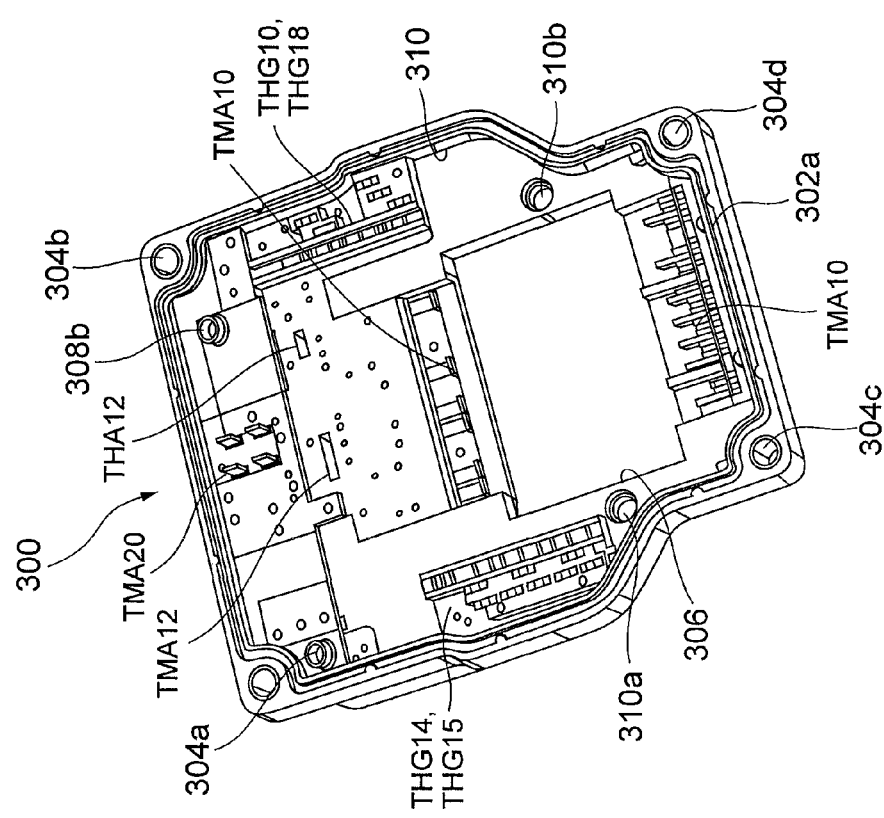

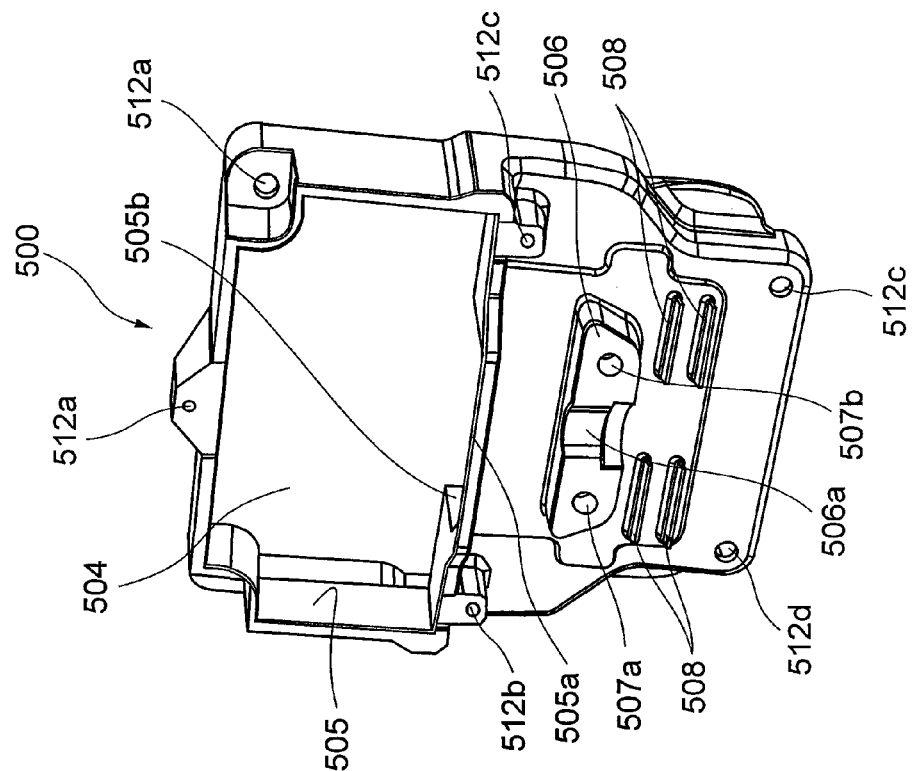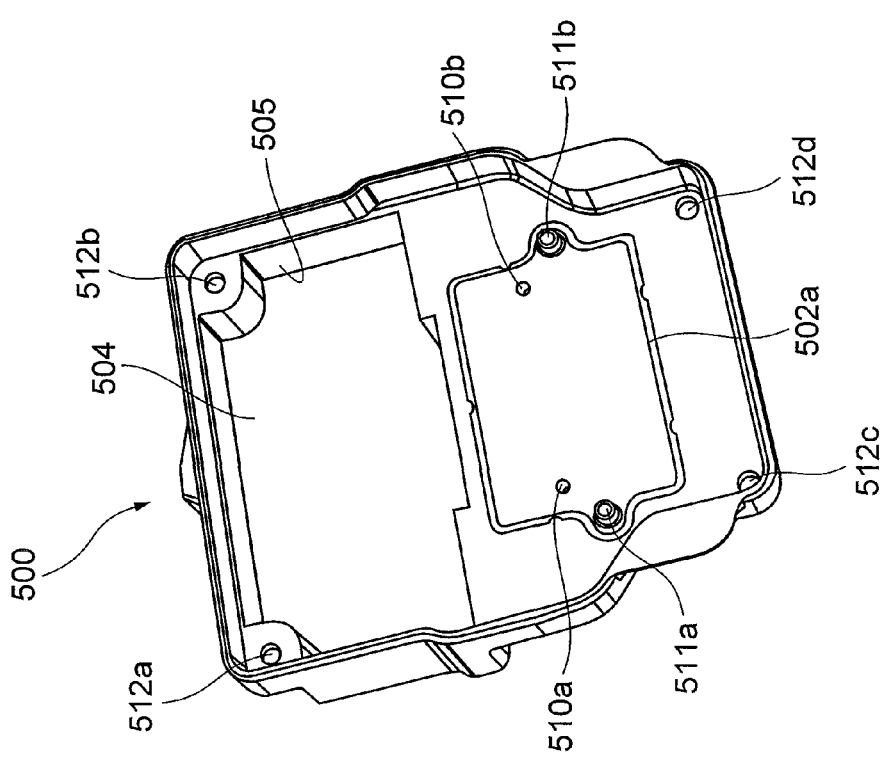

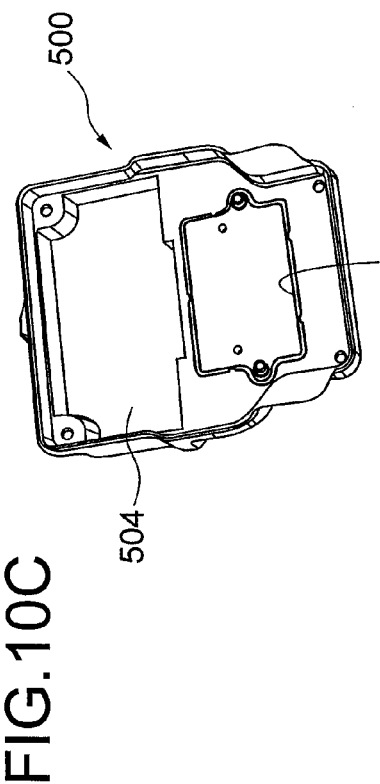
FIG.10C
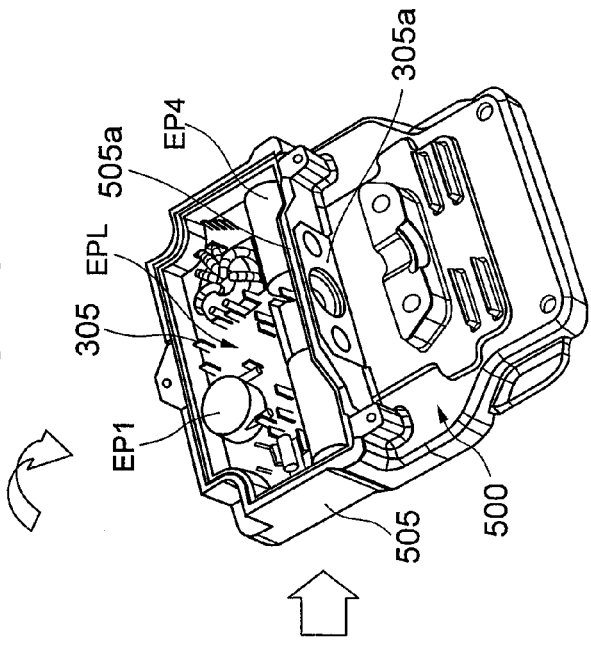
FIG.10D
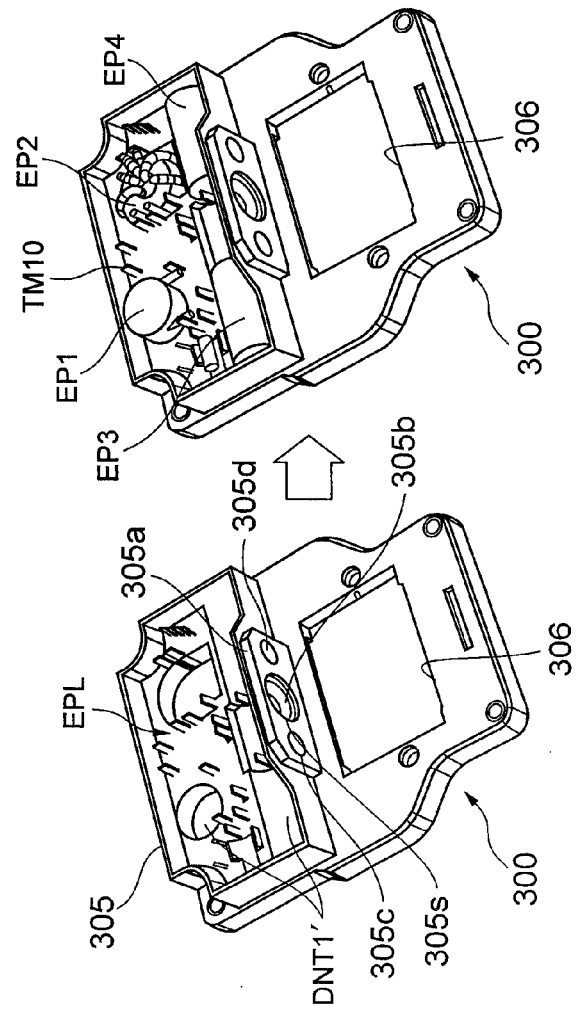
FIG.10B
FIG.10A

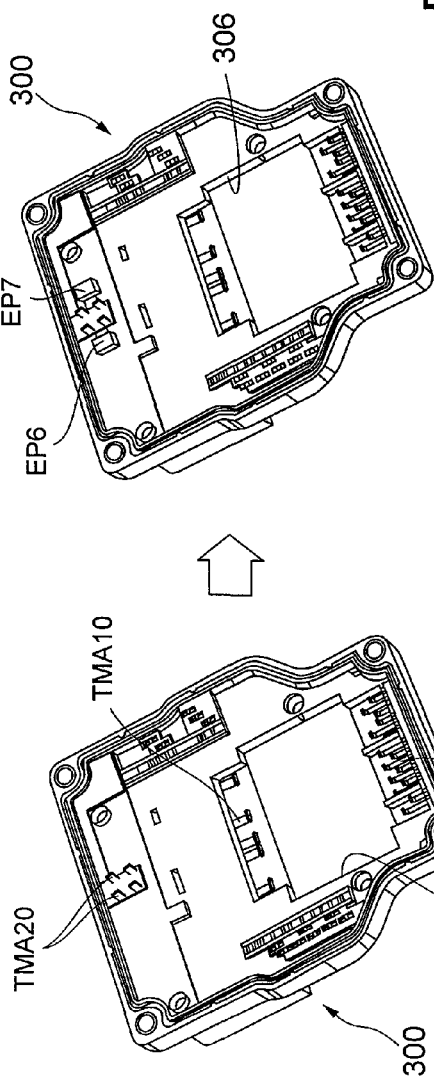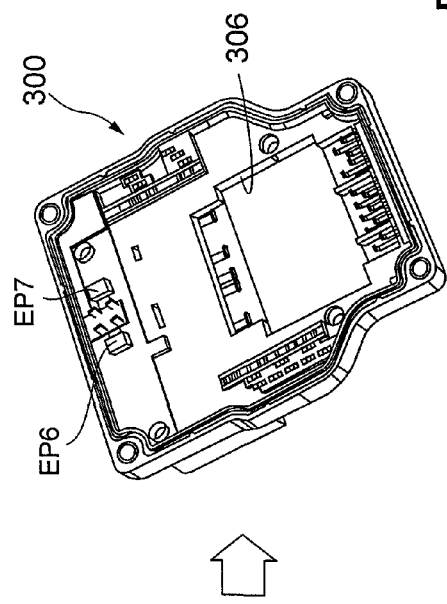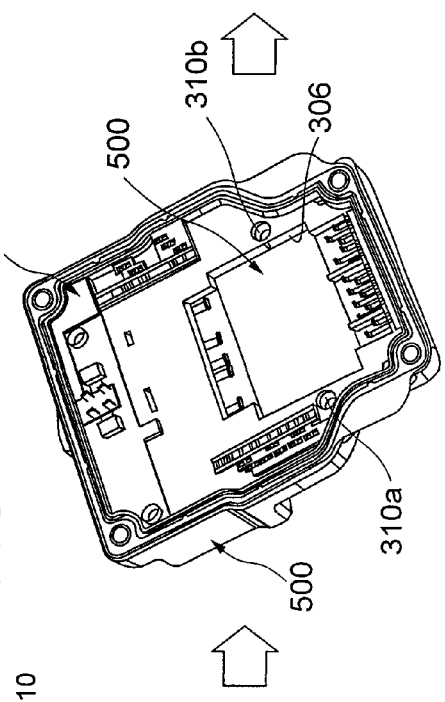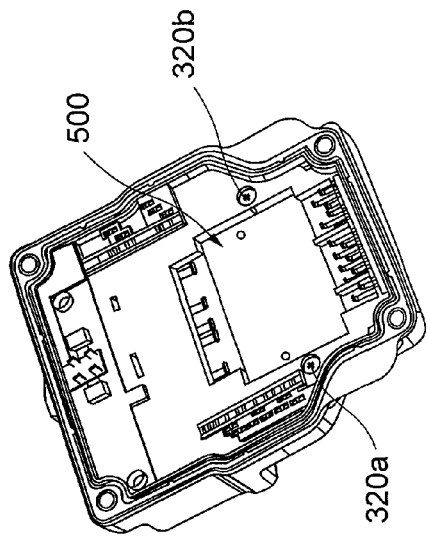

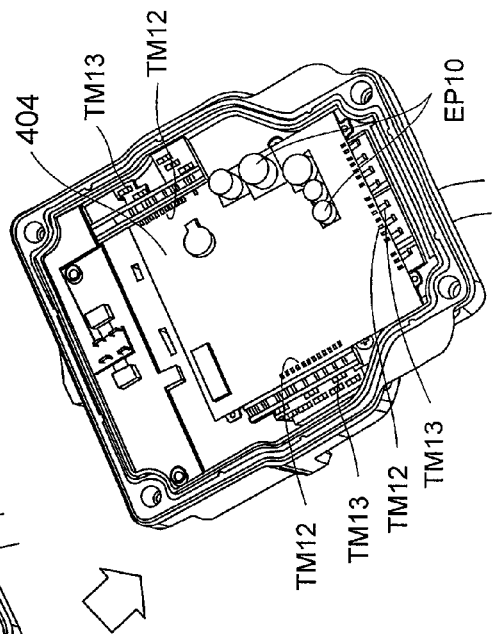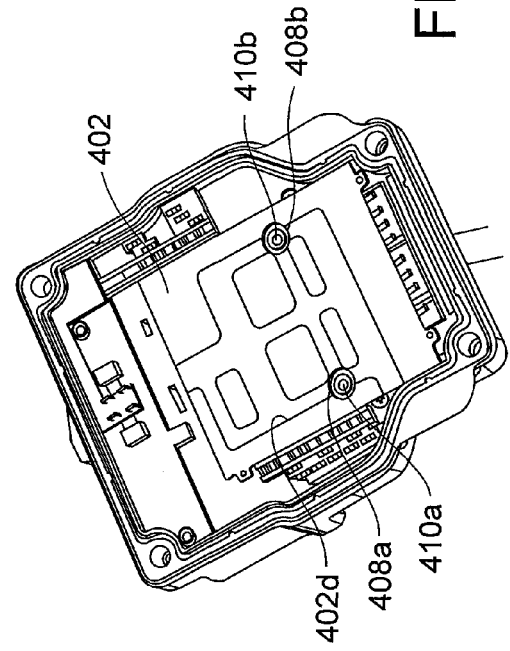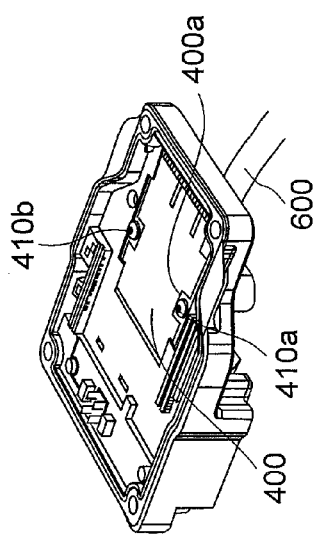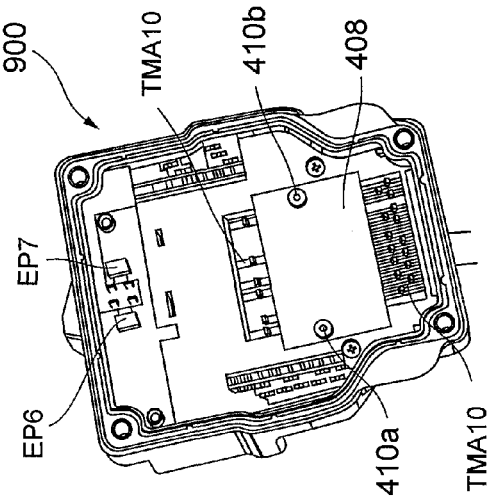

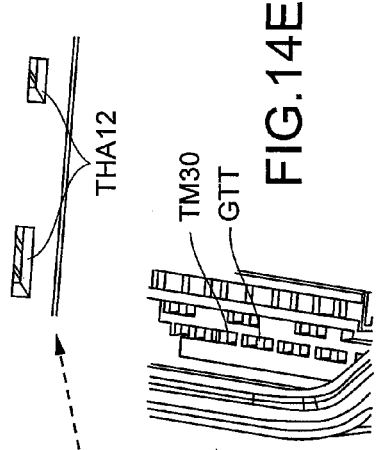
FIG.14A
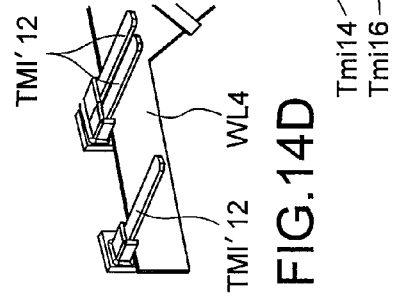
FIG.14B
FIG.14C
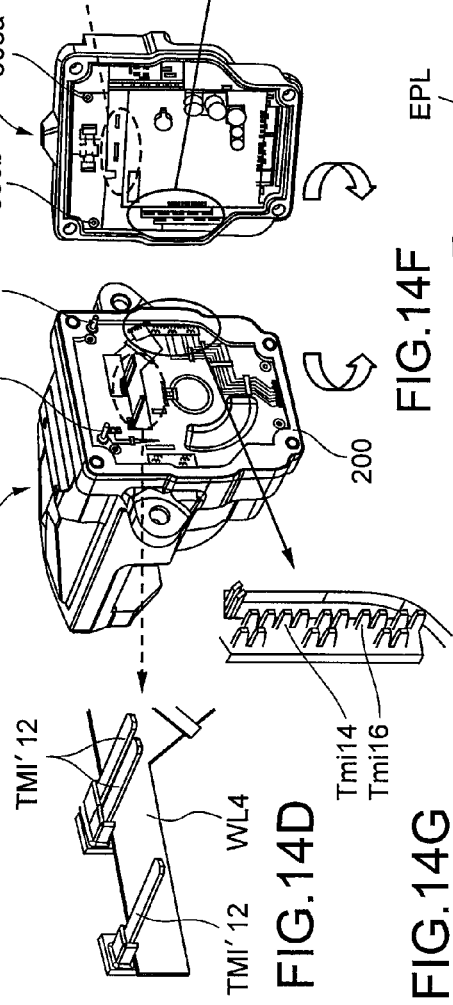
FIG.14D
FIG.14E
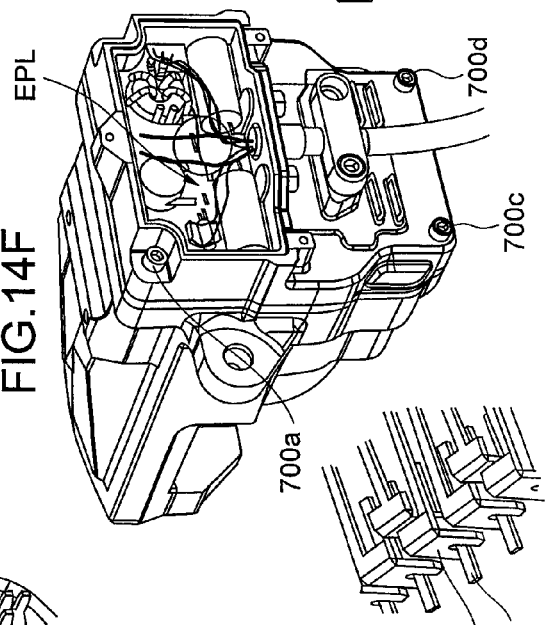
FIG.14F
FIG.14G
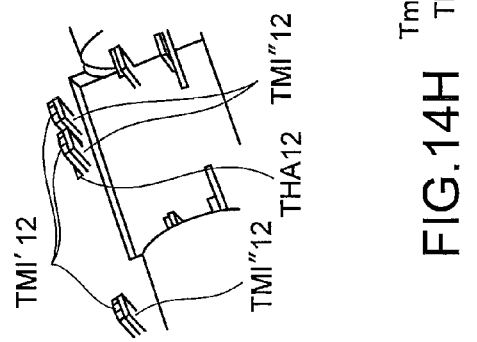
FIG.14H
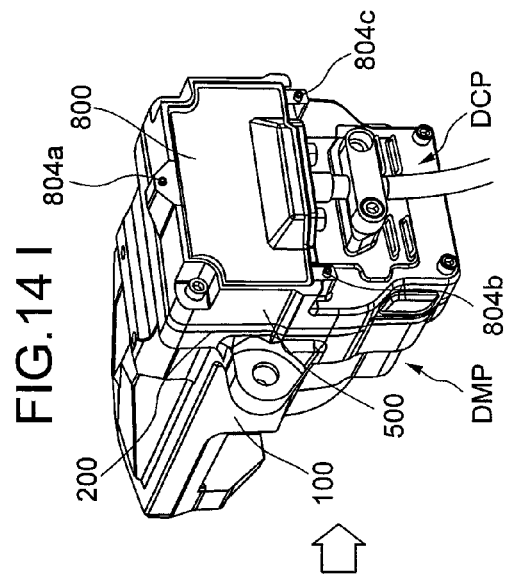
FIG.14 I FIG.15A
FIG.15B
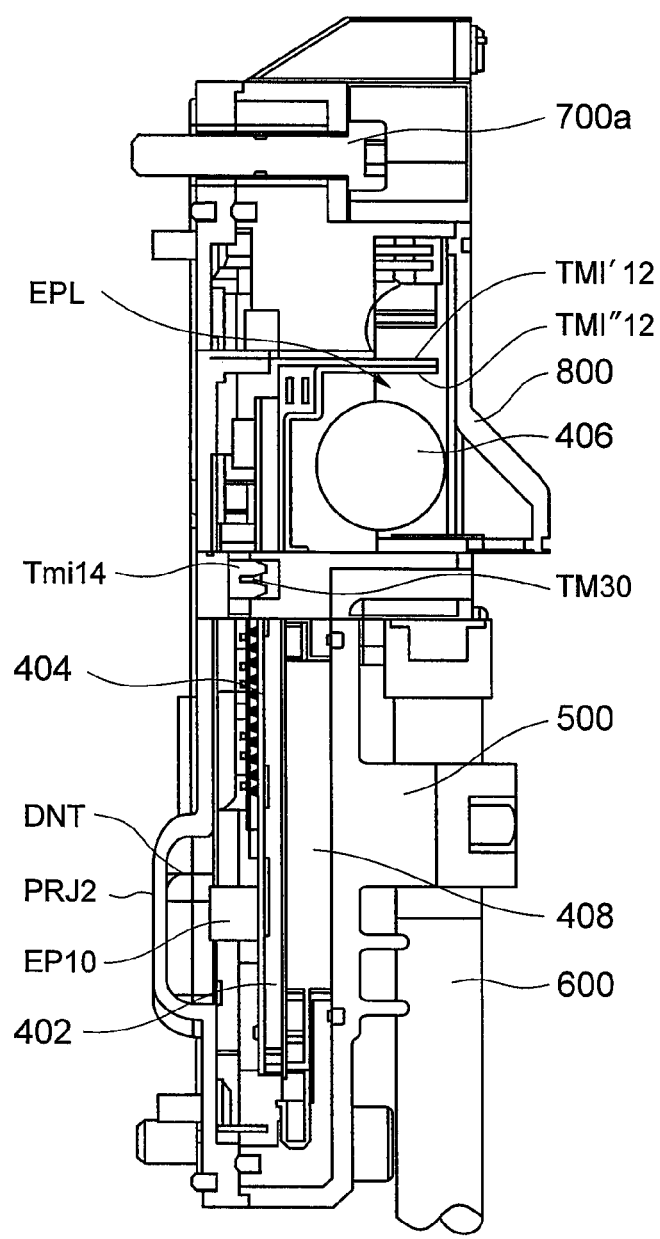
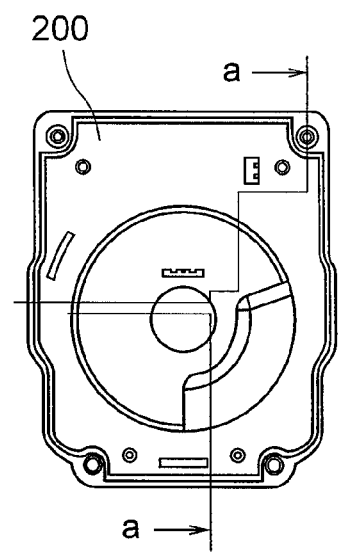

ELECTRO MECHANICAL BRAKE, CONTROL DEVICE

RELATED APPLICATIONS

The present application claims priority under 35 U.S.C. §119 to Japanese Patent Application 2006-101357, filed Apr. 3, 2006, the disclosure of which is incorporated by reference herein in its entirety. This application is related to U.S. application Ser. No. 11/210,889.

BACKGROUND OF THE INVENTION (1) Field of the Invention

The present invention relates to an electro mechanical brake, control device generating a braking force by a rotation force generated in an electric motor.

(2) Description of Related Art

An electro mechanical brake, control device is applied to a brake apparatus generating a braking force by an output of the electric motor. The electro mechanical brake, control device (hereinafter referred to an electro mechanical brake apparatus) comprises an electric circuit portion for controlling an output generated by the electric motor, and a mechanical portion generating a braking force based on the output of the motor. The mechanical portion is mounted on a portion close to wheels of a vehicle, and the electric circuit portion is mounted on the portion on a vehicle spring. That is, the mechanical portion and the electric circuit portion are mounted on the positions physically apart of the vehicle.

The inventors of the present application have thought of the integration of the mechanical portion and the electric circuit portion in view of improving mountability of the electro mechanical brake apparatus to the vehicle.

The electro mechanical brake apparatus of a structure having integrated the mechanical portion and the electric circuit portion is disclosed, for example, in Patent Document 1 (i.e. JP-A-2003-137081) and Patent Document 2 (i.e. JP-A-2005-69268).

BRIEF SUMMARY OF THE INVENTION

The Patent Documents 1 and 2 disclose an electro mechanical brake apparatus having integrally configured a mechanical portion and an electric circuit portion.

Although not disclosed in the above described Patent Documents, taking counter-measures to meet the heat generation is an important subject for study in the integrally configured electro mechanical brake apparatus. The generation of the mechanical braking force is accompanied with the heat generation, and the heat is also generated from the electric circuit. In proportion as a vehicle on which the electro mechanical brake apparatus is mounted becomes larger, the electro mechanical brake apparatus is required to generate much larger braking force, and an increase of a rotational torque generated by the motor is required. Hence, if an attempt is made to apply the electro mechanical brake apparatus up to a much larger vehicle, the heat counter-measure corresponding to an increase of heat value generated in the mechanical portion and the electric circuit portion is required to be improved much more.

An object of the present invention is to provide an electro mechanical brake, control device whose heat counter-measure is improved much more in case the electric circuit portion and the mechanical portion are integrally configured.

From among the aspects of the invention disclosed in the present application, an outline of the representative one will be briefly described as follows.

A control circuit portion is provided for a brake pad by sandwiching a motor, and a power module is provided such that a heat-dissipation surface is opposed to the inner surface of a metal case of the control circuit portion, and a control board is disposed at the motor side for the power module.

Incidentally, the present invention is by no means restricted to the above described configuration, and it is to be understood that various modifications may be made without departing from the scope and spirit of the present invention.

According to the present invention, an electro mechanical brake apparatus can be provided, in which counter-measure for heat generation is improved much more.

Other objects, features and advantages of the invention will become apparent from the following description of the embodiments of the invention taken in conjunction with the accompanying drawings.

BRIEF DESCRIPTION OF THE SEVERAL VIEWS OF THE DRAWING

FIG. 5 is a schematic diagram showing a detailed embodiment of a circuit of the electric circuit portion of the electro mechanical brake apparatus according to the present invention by the relationship with an electric motor, a thrust sensor, a rotational angle detection sensor, and the like;

FIGS. 6A to 6C are perspective views showing one embodiment of an interface module used for the electro mechanical brake apparatus according to the present invention by the relationship with the mechanical portion;

FIGS. 7A and 7B are perspective views showing an inner side surface and an outer side surface showing one embodiment of an interface module used for the electro mechanical brake apparatus according to the present invention;

FIGS. 8A and 8B are perspective views showing an inner side surface and an outer side surface showing one embodiment of an inner case used for the electro mechanical brake apparatus according to the present invention;

FIGS. 9A and 9B are perspective views showing an inner side surface and an outer side surface showing one embodiment of an outer case used for the electro mechanical brake apparatus according to the present invention;

FIGS. 10A to 10D are process drawings showing one embodiment where electronic parts are mounted on the inner case and the outer case is assembled in the manufacture of the electro mechanical brake apparatus according to the present invention;

FIGS. 11A to 11D are process drawings showing one embodiment where electronic parts are mounted in the inner side surface of the inner case when mounting the electronic parts on the inner case and assembling the outer case in the manufacture of the electro mechanical brake apparatus according to the present invention;

FIGS. 13A to 13D are process drawings showing one embodiment when fitting a power module and the like to the inner case in the manufacture of the electro mechanical brake apparatus according to the present invention;

FIGS. 14A to 14I are process drawings showing one embodiment of setting up each other among the assemblies in the manufacture of the electro mechanical brake apparatus according to the present invention; and FIGS. 15A and 15B are views showing a cross-section in one embodiment of an electric circuit portion of the electro mechanical brake apparatus according to the present invention.

DETAILED DESCRIPTION OF THE INVENTION

One embodiment of an electro mechanical brake apparatus according to the present invention will be described with reference to the drawings.

Figure 1:
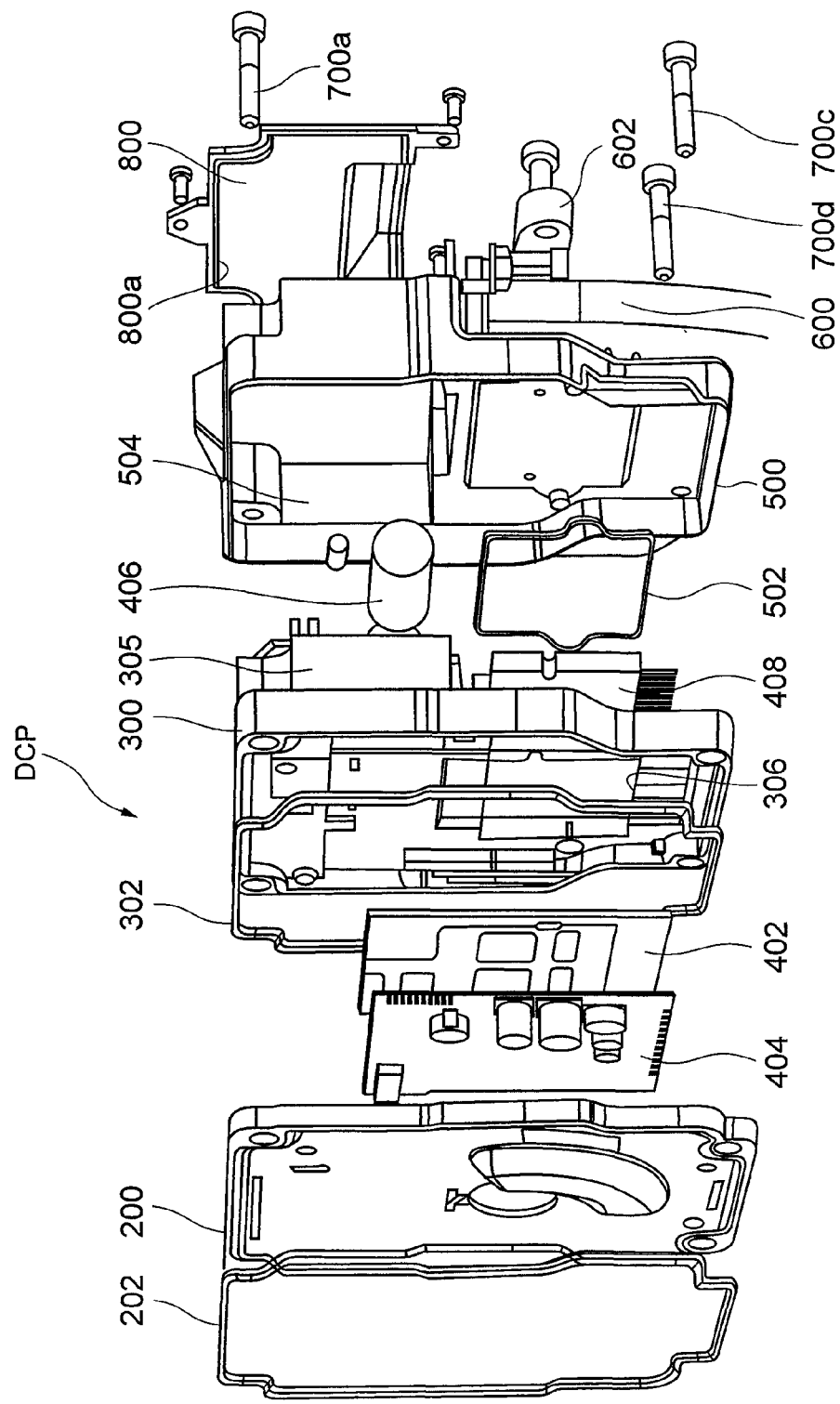
FIG. 1 is a perspective view of disassembling and showing each component of an electric circuit portion of an electro mechanical brake apparatus according to the present invention.

FIG. 1 is a schematic block diagram showing one embodiment of a brake system of a vehicle equipped with the electro mechanical brake apparatus according to the present invention. Incidentally, a description on a driving mechanism for travel motion will be omitted.

On a front wheel 11R side on the right side is mounted a first electro mechanical brake apparatus BR (1) adjacent to an axle 10R, and on a front wheel 11L side on the left side is mounted a second electro mechanical brake apparatus BR(2) adjacent to an axle 10L. Further, on a rear wheel 13R side on the right side is mounted a third electro mechanical brake apparatus BR(3) adjacent to an axle 12R, and on a rear wheel 13L side on the left side is mounted a fourth electro mechanical brake apparatus BR(4) adjacent to an axle 12L of the rear wheel.

The first and second electro mechanical brake apparatuses BR(1) and (2) comprise the same configuration, and the third and fourth electro mechanical brake apparatuses BR (3) and (4) comprise the same configuration. Although each electro mechanical brake is basically of the same configuration, the first and second electro mechanical brakes are configured to generate a braking force greater than the third and fourth electro mechanical brakes.

The axles 10R and 10L of the front wheels and the axles 12R and 12L of the rear wheels are provided with disk rotors DL(1), DL(2), DL(3), and DL(4) which are fixed to the axles, respectively. Although not illustrated in FIG. 2, a mechanical portion DMP of each electro mechanical brake apparatus BR comprises a pair of brake pads opposed to each surface side of the disk rotors DL, and based on the rotation torque of the electric motor, each disk rotor DL is sandwiched and depressed by the brake pad so that a braking force is generated.

Further, each electro mechanical brake apparatus BR is integrally configured such that each mechanical portion DMP is fixed with the electric circuit portion DCP for controlling the current to drive each electric motor. That is, the electric circuit portion DCP is fitted to the surface opposite the brake pad side of, for example, the mechanical portion DMP in the axial direction.

The first electro mechanical brake apparatus BR(1) and the second electro mechanical brake apparatus BR(2) on the front wheel side are supplied with an power source from a first battery VT(1) through a first power source line PWL (1), and the third electro mechanical brake apparatus BR(3) and the fourth electro mechanical brake apparatus BR(4) on the rear wheel side are supplied with an power source from a second battery VT(2) through a second power source line PWL (2). Further, the first electro mechanical brake apparatus BR (1) of the right front wheel and the fourth electro mechanical brake apparatus BR(4) of the left rear wheel may be supplied with the electric source from the first battery, whereas the second electro mechanical brake apparatus BR(2) of the left front wheel and the third electro mechanical brake apparatus BR(3) of the right rear wheel may be supplied with the power source from the second battery different from the first battery. By routing the power source line through two channels, even when an anomaly develops in the one power source line, the other power source line can perform a control, thereby to improve safety. Incidentally, the battery VT which supplies the power source to each electro mechanical brake apparatus BR is not limited to two pieces only as described above, and it may be even one piece or a plurality of two or more pieces, but two or more pieces are better because safety is improved.

The brake system of the vehicle comprises a brake pedal 15, and an amount of pedal force or the like of the brake pedal 15 is detected by a detector 16. The output from the detector 16 corresponding to the amount of pedal force or the like is input to a control circuit ECU (1) through a data signal line DL (0). The control circuit ECU (1) performs a higher-level control processing as a brake system for the electric circuit portion of each electro mechanical brake. This control circuit will be described below as a higher-level control circuit.

The higher-level-control circuit ECU(1), for example, is disposed in a passenger compartment, and while monitoring a status of the electric motor by receiving, for example, a present value of the depressing force, information on the present value of the operation mode, and the like from the first to fourth electro mechanical brake apparatuses BR through each of the data signal lines DL (1) to DL (4), transmits an appropriate control signal according to the amount of pedal force of the brake pedal 15 to each of the first to fourth electro mechanical brake apparatuses BR through each of the data signal lines DL (1) to DL (4), and is allowed to appropriately operate each of the first to fourth brake apparatuses BR, and at the same time, in addition to the above, is allowed to perform, for example, a control of fail-safe and the like.

Incidentally, a control of each electro mechanical brake apparatuses BR in this case may be performed independently of each other or the control may be performed according to each group with the first electro mechanical brake apparatus BR(1) and the second electro mechanical brake apparatus BR (2) at the front wheel side taken as one group, and the third electro mechanical brake apparatus BR(3) and the fourth electro mechanical brake apparatus BR (4) at the rear wheel side taken as another group, or the first electro mechanical brake apparatus BR (1) at the front wheel side and the fourth electro mechanical brake apparatus BR (4) at the rear wheel side taken as one group and the second electro mechanical brake apparatus BR(2) at the front wheel side and the third electro mechanical brake apparatus BR (3) at the rear wheel side taken as another group. By performing a control by grouping, a response of the control can be improved and a load of the control processing of the control circuit can be reduced, thereby having an effect of increasing the processing function of the fail-safe.

The electro mechanical brake apparatus BR of the vehicle configured in such a manner can be directly fitted to a vehicle body, for example, without intermediary of a suspension and the like, and therefore, is vulnerable to the effect of vibrations, and moreover, is used under the environment where moisture easily enters the interior by the traveling in rainy weather.

Further, the electro mechanical brake apparatus BR, as described above, is integrally configured with the electric circuit portion DCP including the control circuit incorporated in the driving unit DMP, and a plurality of semiconductor devices are provided in the control circuit. Since the semiconductor device has a property to change in characteristic by heat, the necessity of reducing the transfer of a high frictional heat generated by the pressure of the brake pad inside the mechanical portion DMP against the disc rotor DL rotating together with the wheel to the electric circuit portion DCP as much as possible arises, and further, the necessity arises to effectively dissipate the heat generated by the semiconductor device itself.

<<Conceptual Configuration of Electro Mechanical Brake Apparatus BR>>

Figure 3:
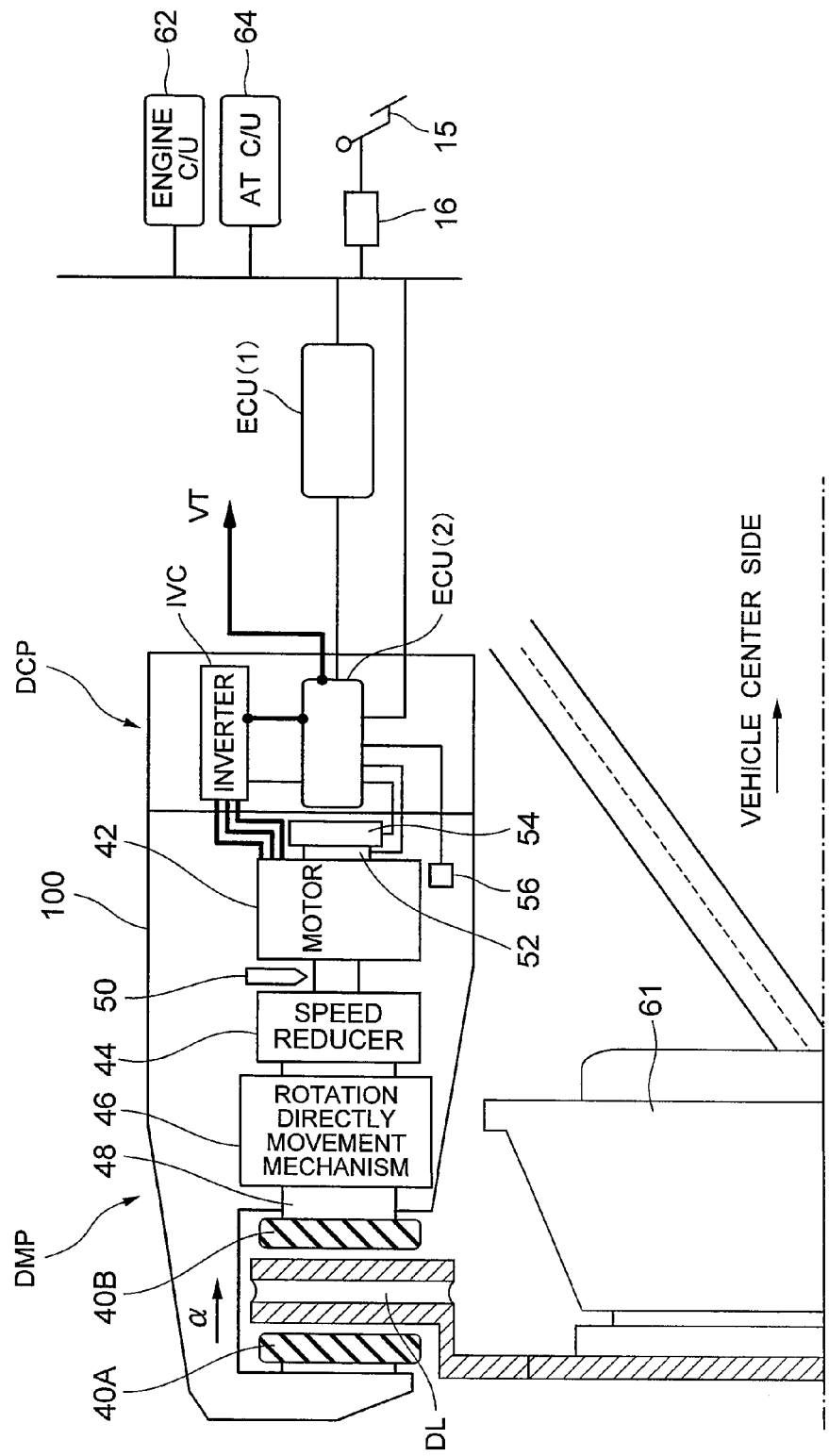
FIG. 3 is a conceptual illustration showing one embodiment of the electro mechanical brake apparatus according to the present invention.

FIG. 3 is a conceptual illustration showing one embodiment of the electro mechanical brake apparatus BR according to the present invention.

The electro mechanical brake apparatus BR is provided with a pair of brake pads 40A and 40B disposed opposite each other inside a housing 100 including a caliper, and a portion of the periphery of the disk rotor DL fitted to the axle and rotating accompanied with the rotation of the axle is positioned between each of the brake pads 40A and 40B, thereby to be supported by the vehicle body.

This electro mechanical brake apparatus BR is integrally configured with the mechanical portion DMP and the electric circuit portion DCP mutually integrated. These mechanical portion DMP and electric circuit portion DCP are separate region-wise, and as a result, the mechanical portion DMP and the electric circuit portion DCP can be also separated structure-wise.

First, the mechanical portion DMP of the electro mechanical brake apparatus BR is provided inside the housing with, for example, an electric motor 42 comprising a three phase motor, a speed reducer 44 for decelerating the rotation of the electric motor 42, and a rotation directly movement mechanism 46 for converting the rotary motion of the electric motor 42 decelerated by this speed reducer 44 into a linear motion and allowing a piston 48 to make a reciprocal motion.

The piston 48 is fitted with the brake pad 40*b*, and this brake pad 40*b* depresses the disc rotor DL from one surface side by a thrust of the piston 48. At this time, with the depressing force as a reaction force, the caliper moves in a direction to the arrow mark α in the Figure so that the brake pad 40A depresses the disc rotor DL from the other surface side.

Further, a portion of the electric motor 42 is provided with a parking brake mechanism (PKB) 50, and by this parking brake mechanism 50, the rotation of the electric motor 42 can be stopped in a state in which a thrust is supplied to the piston 48.

Further, in the vicinity to the electric motor 42, a rotation angle detection sensor 52 for detecting a rotation angle of the electric motor 42, a thrust sensor 54 for detecting a thrust generated by the driving of the electric motor 42, and a motor temperature sensor 56 for detecting a temperature of the electric motor 42 are disposed. Outputs of these rotation angle detection sensor 52, thrust sensor 54, and motor temperature sensor 56 are output to a control circuit ECU (2) disposed inside the electric circuit portion DCP.

Further, the electric circuit portion DCP of the electro mechanical brake apparatus BR is supplied with the power source from the battery VT disposed outside of the electro mechanical brake apparatus BR, and is supplied with a control signal directly through a LAN (Local Area Network) connecting an engine control unit 62, an AT control unit 64, a detector 16 for detecting a pedal force of the brake pedal 15 and the like or through the higher-level control circuit ECU (1) from the LAN.

The electric circuit portion DCP is provided with the lower-level control circuit ECU(2) and an inverter circuit IVC. The inverter circuit IVC is a circuit for controlling the voltage and the like applied to the electric motor 42. The power source and the control signal are input to the control circuit ECU (2), and this control circuit ECU (2) controls the inverter circuit IVC based on output information from the rotation angle detection sensor 52, thrust sensor 54, and motor temperature sensor 56 or the like. The output of the inverter circuit IVC is input to the electric motor 42. As a result, the electric motor 42 is driven in such a manner as to allow the piston 48 to generate a predetermined thrust. Incidentally, reference numeral 61 in the Figure indicates a structure at the side of the vehicle.

<<Cross Section of Specific Configuration of Electro Mechanical Brake Apparatus BR>>

Figure 4:
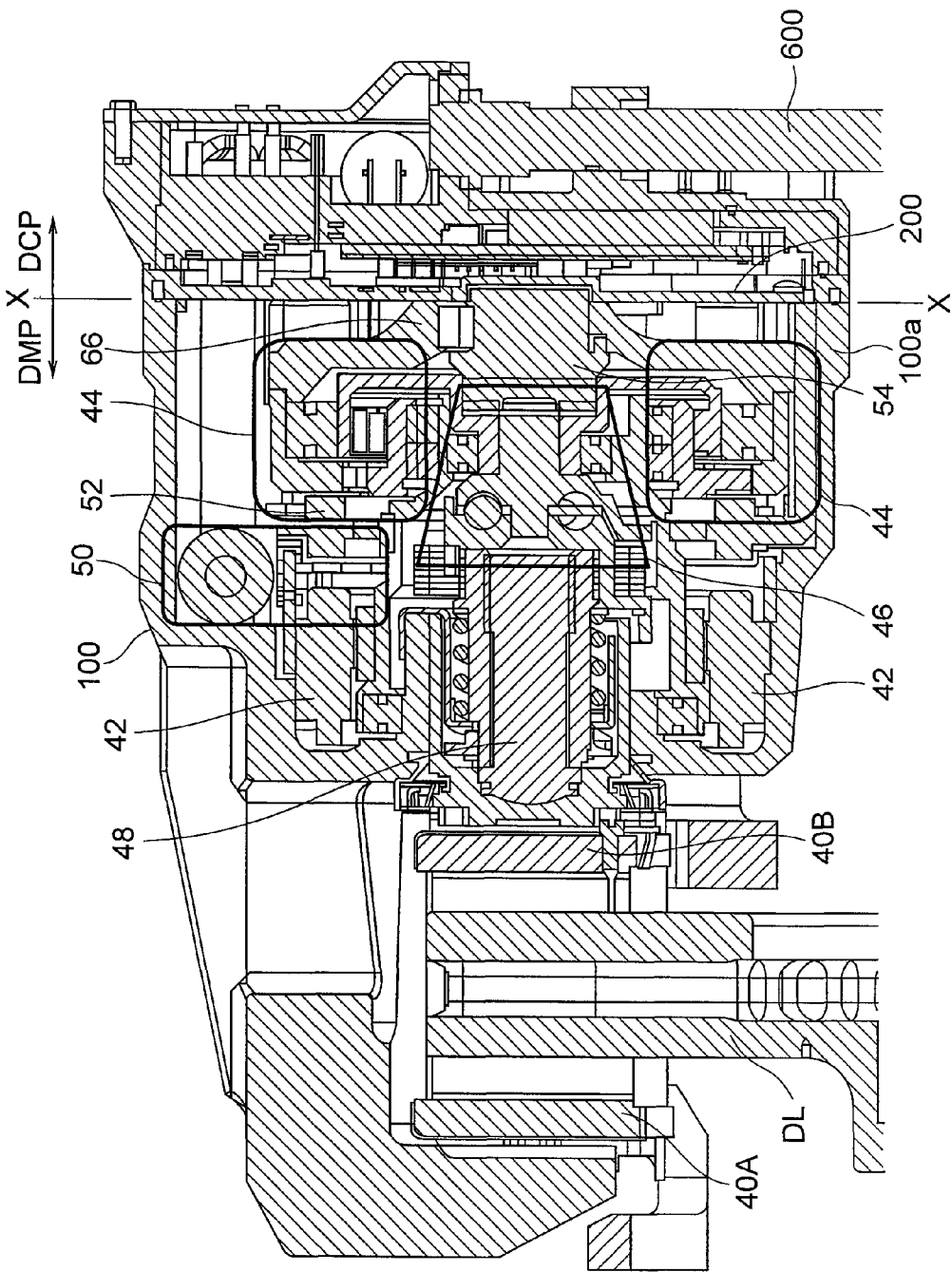
FIG. 4 is a cross-sectional view showing one embodiment of a specific internal configuration of the electro mechanical brake apparatus according to the present invention.

FIG. 4 is a cross-sectional view showing one embodiment of a specific internal configuration of the electro mechanical brake apparatus BR according to the present invention.

In FIG. 4, a boundary between the mechanical portion DMP and electric circuit portion DCP of the mechanical or side brake apparatus BR is equivalent to a portion cut along the line X-X in the Figure. The left side in the Figure of the line X-X shows the mechanical portion DMP, and the right side in the Figure shows the electric circuit portion DCP.

The parking brake mechanism 50 in FIG. 3 is equivalent to the configuration within a thick line frame 50 in FIG. 4, and the speed reducer 44 shown in FIG. 3 is equivalent to the configuration within a thick line frame 44 in FIG. 4, and the rotation directly movement mechanism 46 shown in FIG. 3 is equivalent to the configuration within a thick line frame 46 in FIG. 4.

Further, in FIG. 4, the portion having the same reference number as that attached in FIG. 3 shows the same member as the member shown in FIG. 3.

The electric motor 42, for example, comprises a brushless three phase motor provided with a stator fixed to the housing 100 including a carrier and a rotor disposed within this stator. This electric motor 42 is operated to allow the rotor to rotate only by a desired angle at a desired torque by a command from the higher-level control circuit ECU (1), and its rotational angle is detected by the rotational angle sensor 52.

Further, the speed reducer 44, as described above, decelerates the rotation of the electric motor 42, and by doing so, increases the torque of the electric motor 42. Therefore, as the electric motor 42, a small type of motor can be used.

In each configuration of the mechanical portion DMP, as a component not illustrated in FIG. 3, a thrust plate 66 disposed at the electric circuit portion DCP side is provided. This thrust plate 66 comprises a plate material for receiving a thrust of the piston 48 as a reactive force, and its center portion is disposed with the thrust sensor 54.

In this case, the thrust plate 66 is disposed at a place slightly secluded to the pad unit side for the end surface (portion cut along the line X-X in the Figure) of the housing 100 of the mechanical portion DMP to which the electric circuit portion DCP is fitted. In contrast to this, though the thrust sensor 54 crosses over the end surface of the housing 100 of the mechanical portion DMP and slightly protrudes to the electric circuit portion DCP side, the component (for example, an interface module 200 to be clarified later by the following description) of the electric circuit portion DCP is formed with a recess portion in order to avoid an interference with this thrust sensor 54. This makes a configuration in which a gap (space) is formed between the components of the mechanical portion DMP except for the housing 100 and the components of the electric circuit portion DCP.

The majority of each component of such mechanical portion DMP comprise a metal together with the housing 100, and hence, are configured to be good in heat conductivity. Therefore, the heat from a pad portion as a heat source (brake pads 40A and 40B and its peripheral portion) is transferred to the mechanical portion DMP in its periphery, and is liable to dissipate through the housing 100 on the outside of this mechanical portion DMP.

In this case, since the electric circuit portion DCP is formed, for example, at the surface opposite to the pad portion with the mechanical portion DMP sandwiched therebetween, that is, in a positional relationship in which the electric circuit portion DCP is fitted to the outside of the mechanical portion DMP in the direction to an inner braking surface from an external braking surface of the disc rotor DL, a portion transferred to the electric circuit portion DCP of the heat is made as much small as possible. Between the mechanical portion DMP and the electric circuit portion DCP, the motor 42, speed reducer 44, rotation directly movement mechanism 46, and the like are sandwiched, and the gap (space) is also formed. The electric circuit portion DCP (including a metallic outer case 500 to be described later) is configured to be disposed at the opposite side to the brake pads 40A and 40B by sandwiching the motor 42 and the like. By this motor 42 or the like and the gap (space), the heat transfer from the mechanical portion DMP to the electric circuit portion DCP is made further reduced.

<<Specific Circuit of Electric Circuit Portion DCP>>

Figure 5:
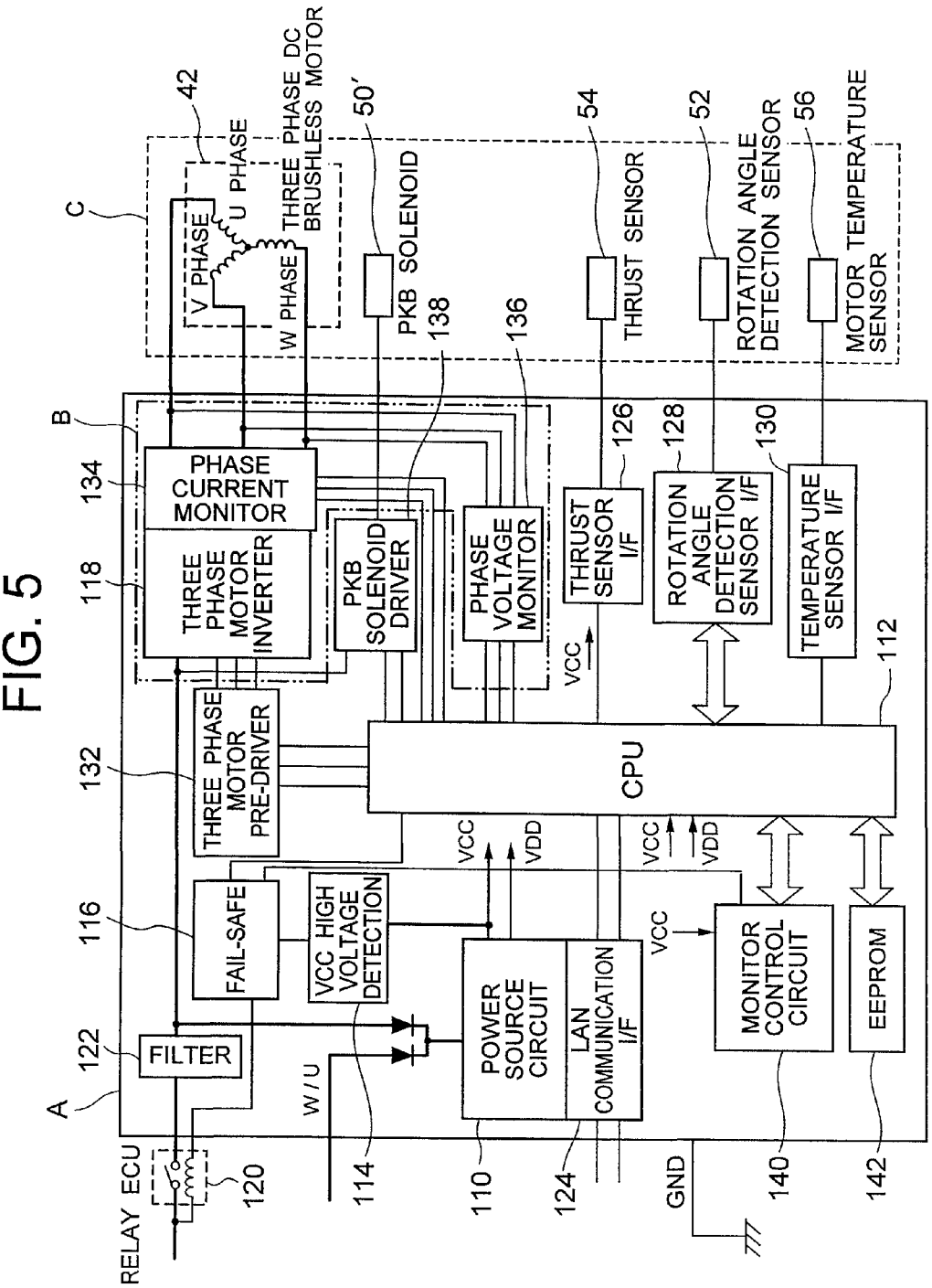

FIG. 5 is a block diagram of a detailed one embodiment of the circuit of the electric circuit portion DCP of the electro mechanical brake apparatus BR according to the present invention shown by the relationship with the electric motor 42, thrust sensor 54, rotation angle detection sensor 52, and the like disposed inside the mechanical portion DMP.

Figure 2:
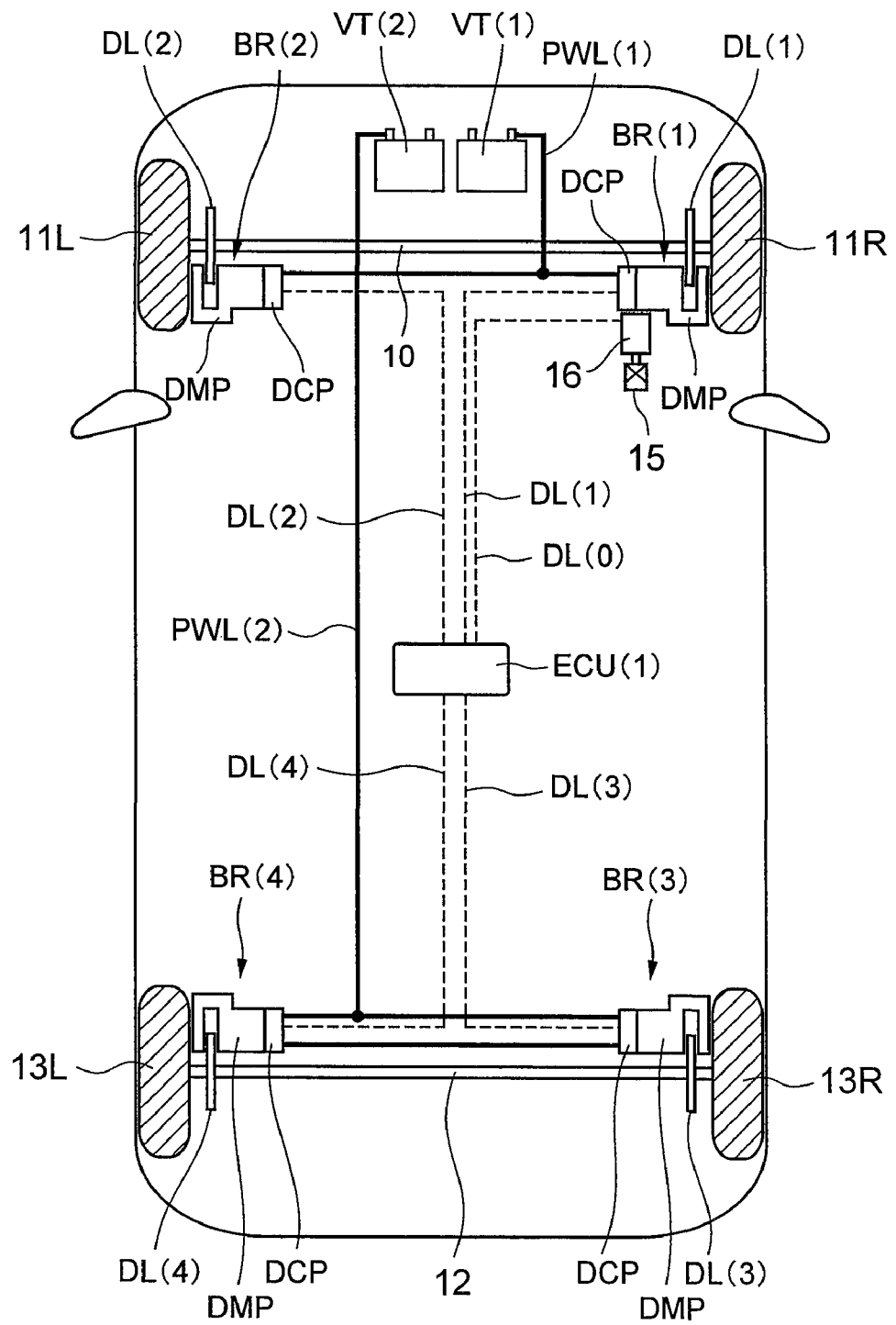
FIG. 2 is a schematic block diagram showing one embodiment where the electro mechanical brake apparatus according to the present invention is applied to an automobile.

The circuit of the electric circuit portion DCP is shown by a thick line frame A in the Figure, of which, a circuit inside a chain line frame B is equivalent to the inverter circuit IVC shown in FIG. 2, and the remaining circuit is equivalent to the control circuit ECU (2) shown in FIG. 3. The circuit of the mechanical portion DMP is shown by a dot line frame C in the Figure.

Here, the circuit shown in FIG. 5, though not illustrated, is covered at least by a metal configuring the housing 100 of the electro mechanical brake apparatus BR, and therefore, the circuit is protected from external damages, and at the same time, attempts to dissipate the heat generated from each circuit and the like, and obtains a shield effect for electromagnetic waves and the like.

First, in the circuit of the electric circuit portion DCP surrounded by the thick line frame A, the power source supplied through a power source line PWL inside the vehicle is inputted to a power source circuit 110. A stable power source (Vcc and Vdd) obtained by this power source circuit 110 is supplied to a central processing unit (CPU) 112.

Further, the power source (Vcc) from the power source circuit 110 is detected by a VCC high voltage detection circuit 114, and when the high voltage is detected by this VCC high voltage detection circuit 114, a fail-safe circuit 116 is allowed to operate.

The fail-safe circuit 116 allows a relay control circuit 120 to operate, which switches the power source to be supplied to a three-phase motor inverter circuit 118 to be described later.

When the high voltage is detected by the VCC high voltage detection circuit 114, the supply of the power source is put into an off state.

The power source supplied into the electric circuit portion DCP through the relay control circuit 120 is removed from noises through the intermediary of the filter circuit 122, and is supplied to the three phase motor inverter circuit 118.

The central control circuit 112 receives a control signal from the higher-level control circuit ECU (1) (see FIG. 2) through a LAN communication interface circuit 124, and at the same time, receives the outputs from the thrust sensor 54 disposed at the mechanical portion DMP side, rotation angle detection sensor 52, and motor temperature sensor 56, respectively through a thrust sensor interface circuit 126, a rotation angle detection sensor interface circuit 128, and a motor temperature sensor interface circuit 130. This is for the purpose of inputting information on a current status or the like of the electric motor 42, and performing a feedback control based on a control signal from the higher-level control circuit ECU (1), thereby to obtain an appropriate thrust for the electric motor 42.

That is, the central control circuit 112, based on the control signal from the higher-level control circuit ECU(1) and a detection value of each sensor, allows a three phase motor pre-driver circuit 132 to output an appropriate signal. This three-phase motor pre-driver circuit 132 is allowed to control the three-phase motor inverter circuit 118. In this case, the three-phase motor inverter circuit 118 is provided with a phase current monitor circuit 134 and a phase voltage monitor circuit 136. By these phase current monitor circuit 134 and phase voltage monitor circuit 136, the phase current and the phase voltage are monitored, respectively. The outputs of these circuits are allowed to appropriately operate the three-phase motor pre-driver circuit 132 through the central control circuit 112. The three-phase motor inverter circuit 118 is connected to the electric motor 42 inside the mechanical portion DMP, and performs the driving according to a control by the central control circuit 112.

Incidentally, since the three-phase motor inverter circuit 118 is thus configured to control the current and voltage which drive the electric motor 42, a semiconductor device having a relatively large output is used in the circuit comprising such a configuration. Therefore, though a high heat is generated in the operation, a configuration to be described later takes measures to meet the situation.

Further, the central control circuit 112, based on a control signal from the higher-level control circuit ECU (1) and a detection value and the like of each sensor, operates a PKB solenoid 50' inside the mechanical portion DMP through a PKB (parking brake) solenoid driver circuit 138, so that a parking brake can be performed. Incidentally, the PKB solenoid driver circuit 138 is supplied with the power source supplied to the three-phase motor inverter circuit 118.

Further, the electric circuit portion DCP is provided with a monitor control circuit 140 for performing transmission and reception of the signals with the central control circuit 112, for example, a storage circuit 142 comprising an EEPROM storing failure information and the like, and the central processing unit 112, based on the information from these monitor control circuit 140 and storage circuit 142, performs a control for obtaining an appropriate thrust in the driving of the electric motor 42.

The electric circuit portion DCP thus configured is configured such that the wire connections with the mechanical portion DMP are many, whereas the wire connections with the circuits (battery VT and higher-level control circuit ECU (1)) other than the mechanical portion DMP are extremely few. This means that, in the electro mechanical brake apparatus BR comprising an integral configuration with the mechanical portion DMP and the electric circuit portion DCP, complicated wire connections between the mechanical portion DMP and the electric circuit portion DCP can be made easy, and at the same time, the wire connection itself between the electro mechanical brake apparatus BR and the battery VT or the higher-level control circuit ECU (1) can be made extremely easy.

<<Disassembled Block Diagram of Electric Circuit Portion DCP>>

FIG. 1 is a perspective view disassembling and showing each component of the electric circuit portion DCP.

Each component will be schematically shown in relation to other components.

First, there is the interface module 200 fitted to the housing of the mechanical portion DMP. This interface module 200, for example, comprises synthetic resin such as PPS.

In the periphery of the surface at the side of the mechanical portion DMP of the interface module 200, for example, a seal 202 is disposed so as to surround a center portion except for the periphery, and through this seal 202, the interface module 200 is fitted to the housing of the mechanical portion DMP. By this seal 202, infiltration of the moisture and foreign matters or the like from between the mechanical portion DMP and the interface module 200 is prevented.

This interface module 200 has a function as a wiring board for electrically pulling out a terminal (not illustrated) disposed at the side of the mechanical portion DMP of this interface module 200 up to the surface opposite to the mechanical portion DMP. The surface opposite to the mechanical portion DMP of the interface module 200 is provided with a terminal (not illustrated) positionally decided in relation to the wire formed in the inner case 300 to be described later.

There is the inner case 300, which is fitted to the interface module 200. This inner case 300 comprises synthetic resin, for example, such as PPS. In the periphery of the surface of the interface module 200 side of the inner case 300, a seal 302 is disposed so as to surround a center portion except for the periphery, and through this seal 302, the inner case 300 is fitted to the interface module 200. By this seal 300, infiltration of the moisture and foreign matters from between the interface module 200 and the inner case 300 is prevented.

This inner case 300 has a function to mount electronic parts, and on the surface at the interface module 200 side, for example, a metal plate 402 comprising an aluminum plate and a control circuit board 404 is superposed and mounted in order. The control circuit board 404 has its board, for example, configured by ceramic, and the metal plate 402 is provided so as to avoid damages of the control circuit board 404 due to, for example, twisting and the like. This control circuit board 404 is equivalent to the three-phase motor pre-driver circuit 132 shown in FIG. 5.

In this case, the surfaces where the inner case 300 and the interface module 200 are opposed each other is formed with a recess portion (not illustrated) at a portion except for the peripheral portion including the seal 302, and the metal plate 402 and the control circuit board 404 are disposed inside this recess portion so as to be stored between the inner case 300 and the interface module 200.

Further, the surface opposite the interface module 200 of the inner case 300, in the one region of its region split into two halves, is formed with a wall portion 305 so as to surround that one region. Inside this wall portion 305, a relatively large size electronic part 406, for example, comprising a capacitor or a reactance or the like is mounted, and in the other region, a through hole 306 having a relatively large area is formed in a portion of the region. Inside this through hole 306, a power module 408 is disposed. This power module 408 is equivalent to the three-phase motor inverter circuit 118, phase current monitor circuit 134, and phase voltage monitor circuit 136 shown in FIG. 5, and is configured by molding these circuits.

Further, the surface opposite the interface module 200 of the inner case 300 is fitted with an outer case 500. This outer case 500 allows an electronic part mounting region of the interior of the wall portion 305 of the inner case 300 to be opened by an opening 504, and is fitted so as to cover the remaining other regions, that is, a circumferential surface of the inner case 300, the circumferential surface of the wall portion 305 of the inner case 300, and the through hole 306 in which the power module 408 is disposed, and its periphery, respectively.

The outer case 500, for example, comprises a metal such as an aluminum alloy, and by this outer case 500, the majority of the outer peripheral portion of the electric circuit portion DCP is covered, and is mechanically protected from a shock from the outside.

Incidentally, the power module 408, as illustrated in the Figure, is disposed in such a manner that a heat dissipating surface is opposed to the inner surface of the outer case 500. The outer case 500 is provided with a concave portion, and in a space created with the interface module 200, the power module 408 is provided (to be described later). Further, the control circuit board 404 weak against heat is provided in the interior of the outer case 500, and is disposed at the mechanical portion DMP side for the power module 408. When seeing the entire electro mechanical brake apparatus, the heat transferred to the interior of the mechanical portion DMP from among the heat of the frictional surface between the disc rotor DL and the brake pads 40A and 40B, as described in FIG. 4, is hard to be transferred by the electric motor 42 or the like and the gap (space). Further, the heat generated from the power module inside the electric circuit portion DCP is dissipated to the outside of the outer case 500 through the inner surface of the opposing outer case 500. Consequently, the control circuit board 404 disposed at the mechanical portion DMO side for the power module 408 is hard to be transferred with heat generated from respective heat sources, and is protected from the heat.

Incidentally, a portion which is a surface at the inner case 300 side of the outer case 500 and is opposed to the through hole 306 of the inner case 300 and its periphery is disposed with a seal 502 so as to surround the through hole 306. This seal 502, for example, is provided to prevent the moisture from infiltrating into the surface at the interface module 200 side of the inner case 300 from the opening portion 504 of the outer case 500 through the through hole 306 of the inner case 300.

The outer case 500 is fixed with a harness 600 for supplying a power source or a control signal and the like from the external portion side of the electro mechanical brake apparatus by the harness stopper 602, and each wiring (not illustrated) inside the harness 600 is guided to the electronic parts mounting region inside the wall portion 305 through the through hole (not illustrated) formed in the wall portion 305 of the inner case 300.

The interface module 200, inner case 300, and outer case 500 thus configured are integrated by bolts 700a, 700b (not illustrated), 700c, and 700d inserted from the outer case 500 side into screw holes formed at respective four corners, and at the same time, are fitted to the mechanical portion DMP.

Further, the opening portion 504 of the outer case 500 is covered by a cover 800 which is screwed to the outer case 500.

The cover 800, for example, is formed by a metal such as aluminum alloy similarly to the outer case 500.

Hereinafter, each component such as the interface module 200, inner case 300, and outer case 504 will be described in detail.

<<Interface Module 200>>

First, the interface module 200, as shown in FIGS. 6A to 6C, is disposed by being directly fitted to the housing 100 including the caliper of the mechanical portion DMP and the like.

FIG. 6A is a perspective view of the mechanical portion DMP, and shows a surface where the interface module 200 is fitted. FIG. 6B is a perspective view of the interface module 200, and shows a surface (surface opposite the inner case 300 to be described later) opposite the surface fitted to the mechanical portion DMP. FIG. 6C is a perspective view where the interface module 200 is fitted to the mechanical portion DMP, and shows a surface in its majority opposite the inner case 300 to be described later of the interface module 200.

Here, as shown by FIG. 6A, at the surface side fitted with the interface module 200 of the mechanical portion DMP, a thrust plate 102 is, for example, visually observable inside a frame body 100a configuring a part of the housing 100 and provided at the electric circuit portion DCP side. This thrust plate 102 is for receiving a reaction force by a direct motion of the piston 48, and at its center, a thrust sensor 104 is disposed. The thrust plate 102 and the thrust sensor 104 are shaped circular, respectively, and the frame body 100a is, for example, shaped oblong.

The frame body 100a is formed so as to protrude toward the interface module 200 side rather than the thrust plate 102, and as a result, the thrust plate 102 is disposed at a place lied deeper than the end surface (surface abutting on the interface module 200) of the frame body 100a. The reason why the configuration is set up in this manner is to positively form a gap (space) between the thrust plate 102 (and the thrust sensor 104) and the interface module 200, and after the heat with the pad portion as the heat source is transferred inside the mechanical portion DMP, the heat is controlled to be transferred to the electric circuit portion DCP side by the gap portion.

The mechanical portion DMP is provided with terminals TM for supplying a power source or signal from the electric circuit portion DCP to a part of the periphery of the thrust plate 102. These terminals TM, when seen from the side capable of visually observing the thrust plate 102, comprise a terminal TM10 of the parking brake solenoid disposed at the upper side in the Figure, a three-phase terminal TM 12 and a terminal TM14 of the temperature sensor disposed at the right upper side in the Figure, and a terminal TM16 of the rotation angle sensor disposed at the lower side in the Figure or the like. Further, the thrust sensor 104 is provided with a terminal TM18 which is the electrode thereof.

Each of these terminals TM is configured by a flat plate like electrical conductor, respectively, and its top end is formed to be expanded sufficiently well over the end surface (surface abutting on the interface module 200) of the frame body 100a.

The reason why each terminal TM is sufficiently expanded to the side of the interface module 200 in this manner is because the top end portion of each terminal TM is allowed to pass through and to be inserted into a through hole TH formed in the interface module 200, and to be protruded until reaching a surface at the side of the inner case 300 to be described later of the interface module 200.

The interface module 200 shown in FIG. 6B is formed with a through hole TH10 inserted with the terminal TM10 of the parking brake solenoid, a though hole commonly forming a through hole TH12 inserted with the three-phase terminal TM12 and a though hole TH14 inserted with the terminal TM14 of the temperature sensor, a through hole TH16 inserted with the terminal TM16 of the rotation angle sensor, and a through hole TH18 inserted with the terminal TM18 of the thrust sensor 104. Further, FIG. 6C showing a fitting structure to the mechanical portion DMP of the interface module 200 shows a state in which the terminal TM10 of the parking brake solenoid is protruded from the through hole TH10, a state in which the three-phase terminal TM12 and the terminal TM14 of the temperature sensor are protruded from the through holes TH12 and TH14 comprising a common through hole, a state in which the terminal TM16 of the rotation angle sensor is protruded from the through hole TH16, and a state in which the terminal TM18 of the thrust sensor 104 is protruded from the through hole.

Incidentally, each of the through holes TH of the interface module 200 is formed large enough to the extent of having a sufficient gap around the terminal TM inserted therein. This is for the purpose of allowing these respective through holes TM to function as air nozzles inside the electro mechanical brake apparatus BR, and performing pressure adjustment allowed to follow the change of the outside air, while preventing the infiltration of the moisture into the electro mechanical brake apparatus BR to be described later.

FIGS. 7A and 7B are views showing still further detailed configuration of the interface module 200. FIG. 7A is a perspective view seen from a surface (external surface) opposite the inner case 300 to be described later of the interface module 200, and FIG. 7B is a perspective view seen from a surface (inside surface) opposite the surface shown in FIG. 7A, and is equivalent to a view seen from the surface fitted to the mechanical portion DMP.

This interface module 200 comprises a wiring and a wiring circuit board having a terminal connected to this wiring, and the circuit board is configured, for example, by synthetic resin as described above. Synthetic resin is generally low in heat conduction, and the transmission of heat from the mechanical portion DMP can be controlled by this interface module 200.

As shown in FIG. 7A, in the external surface of the interface module 200, a thickness of the peripheral portion is formed larger than the thickness of the center portion except for the peripheral portion, and therefore, a step portion 202 formed by the difference of each thickness exists in the portion reaching slightly inner side from an outer contour of the interface module 200.

Large-diameter holes 204a, 204b, 204c, and 204d formed at the peripheral portions of respective thickness of four corners of the interface module 200, and small-diameter holes 206a, 206b, 206c, and 206d adjacent to the large-diameter holes 204a, 204b, 204c, and 204d, respectively, and formed in the portion of thin thickness are provided. The large-diameter holes 204a, 204b, 204c, and 204d are screw holes for fixing the interface module 200 together with the inner case 300 and the outer case 500 to be described later to the mechanical portion DMP, whereas the small-diameter holes 206a, 206b, 206c, and 206d are screw holes for temporarily fixing the interface module 200 to the mechanical portion DMP.

Further, for example, at the portion close to the two large-diameter holes 204a and 204b from among the above described four large-diameter holes, protrusion poles 208a and 208b are protruded and formed. These protrusion poles 208a and 208b are inserted into the holes (shown by reference numerals 308a and 308b in FIG. 8A) formed in the inner case 300 thereby enabling mutual positioning when the inner case 300 to be described later is disposed opposite to the interface module 200.

The interface module 200 is buried and formed, for example, with wiring layers WL in its interior (wiring layers WL shown in FIG. 7A are shown by looking through them), and the terminals provided in the interface module 200 are connected to the ends of these wiring layers WL or in the midst thereof. Incidentally, these wiring layers WL may be formed on the surface of the interface module 200 or may be not necessarily buried inside the interface module 200.

These respective wiring layers WL are formed in such a manner as to electrically pull out the terminals TM fitted to the mechanical portion DMP close to the terminals formed in the inner case 300 to be described later.

That is, the terminals TM116 disposed close to the through hole TH16 from which the terminal TM16 of the rotation angle sensor is protruded, are provided, and these terminals TM116 are pulled out up to the periphery of the right side of the center in the Figure through respective wiring layers WL1, and are connected to bifurcate terminals Tmi16 provided on that periphery. Further, terminals TM118 disposed close to a through hole TH18, from which the terminal TM18 of the thrust sensor is protruded, are provided, and these terminals TM118 are pulled out up to the periphery of the left side of the center in the Figure through the respective wiring layers WL2, and are connected to bifurcate terminals Tmi18 provided in that periphery. Further, terminals TM110 disposed close to the through hole TH10, from which the terminal TM10 of the parking brake solenoid is protruded, are provided, and these terminals TM110 are connected to other bifurcate terminals Tmi19 provided at a portion close to the bifurcate terminals Tmi18 through respective wiring layers WL3. Further, terminals TM114 disposed close to the through hole TH14, from which the terminal TM14 of the temperature sensor is protruded, are provided, and these terminals TM114 are connected to the other bifurcate terminals Tmi14 provided at a portion close to the bifurcate terminals Tmi16 through respective wiring layers (not illustrated). Further, terminals TM112 disposed close to the through hole TH12, from which the three phase terminal TM12 is protruded, are provided, and these terminals TM112 are pulled out up to the upper portion of the center in the Figure through respective wiring layers WL4, and are connected to terminals TMI'12 provided to this upper portion.

This wiring layer WL4 is formed thick in line width comparing with other wiring layers WL1, WL2, and WL3 or the like. This is because the wiring layers WL1, WL2, WL3 or the like perform transmission and reception of the signals, whereas the wiring layer WL4 is formed as a power system bus for performing the supply of the power source. The terminals TMI'12 are formed relatively large in height. This is for the purpose of inserting these terminals into a through hole (shown by reference numeral THA12 of FIG. 8A) formed on the inner case 300 to be described later, and allowing the terminals to protrude up to the surface opposite the inner case 300.

When this interface module 200, as shown in FIG. 6C, is disposed at a fixed position of the mechanical portion DMP, each terminal TM116 disposed close to the through hole TH16, from which each terminal TM16 of the rotation angle sensor is protruded, is contiguous and opposed to each corresponding terminal TM16 of the rotation angle sensor, and these terminals are electrically connected, for example, by welding. Further, each terminal TM110 disposed close to the through hole TH10, from which each terminal TM10 of the parking brake solenoid is protruded, is contiguous and opposed to each corresponding terminal TM10 of the parking brake solenoid, and these terminals are electrically connected, for example, by welding. Further, each terminal TMI12 disposed close to the through hole TH12 from which the three phase terminal TM12 is protruded is contiguous and opposed to the three phase terminal TM12, and these terminals are electrically connected, for example, by welding. Further, each terminal TMI14 disposed close to the though hole TH14 from which the terminal TM14 of the temperature sensor is protruded, is congruous and opposed to the terminal TM14 of the temperature sensor, and these terminals are electrically connected, for example, by welding. Further, each terminal TMI18 disposed close to the through hole TH18 from which the terminal TM18 of the thrust sensor is protruded, is contiguous and opposed to each terminal TM18 of the thrust sensor, and these terminals are electrically connected, for example, by soldering.

Here, the terminal TM and the other terminal TMI electrically connected to the terminal TM by welding and the like except for the bifurcate terminals Tmi are shaped planar, respectively, and these main surfaces (surface except for a side surface) having a relatively large area are mutually opposed, and these mutually opposed surfaces are connected so as to assure reliability of electric connection.

Incidentally, the interface module 200, as shown in FIG. 7A, has a protrusion portion PRJ1 formed in a portion opposed to the thrust sensor 54. Since this protrusion portion PRJ1 is formed larger in height than the thickness of the interface module 200, as shown in FIG. 7B, it is formed as a recess portion DNT1 in the rear surface of the interface module 200. As a result, an event that the thrust sensor 54 provided at the mechanical portion DMP side is disposed by slightly being protruded from the end surface of the frame body 100a, thereby causing an interference with the interface module 200 is avoided by the recess portion DMNT1. Further, in the periphery of a portion of the protrusion portion PRJ1, a circular recess DNT2 with this portion as a center is formed. This recess portion DNT2 becomes a portion opposed to the electronic parts and the like mounted on the inner case 300 to be described later, and allows the electric parts and the like to avoid from interfering with the interface module 200, and is provided such that the electronic parts and the like can be stored. Since this recess portion DNT2 is formed larger in depth than the thickness of the interface module 200, as shown in FIG. 7B, it is formed as a protrusion portion PRJ2 in the rear surface of the interface module 200.

As shown in FIG. 7B, in the periphery of the surface at the side fitted to the mechanical portion DNP of the interface module 200, a groove 202a is formed so as surround the center portion except for the periphery, thereby to dispose the large-diameter holes 204a, 204b, 204c and 204d at the outside. This groove 202a is fitted with the seal 202 (not illustrated). This is for the purpose of allowing the seal 202 to intervene in the boundary surface between the frame body 100a and the interface module 200, thereby to prevent infiltration of the moisture and foreign matters through the boundary surface when the interface module 200 is allowed to be disposed and abutted on the frame body 100a of the mechanical portion DMP.

Further, in the inner side of the groove 202a, a partially protruded body PR is formed. When the interface module 200 is abutted and disposed on the frame body 100a of the mechanical portion DMP, this protruded body PR is abutted and disposed on the inner side surface side of the frame body 100a of the mechanical portion DMP, and can perform a positioning of the interface module 200 for the frame body 100a.

(Inner Case 300)

FIGS. 8A and 8B are block diagrams showing one embodiment of the inner case 300, and FIG. 8A is an oblique view seen from a surface (inner surface) opposing to the interface module 200 of the inner case 300, and FIG. 8B shows a surface (outer surface) opposite the surface shown in FIG. 8A.

Although the inner surface 300, as will be clarified by the description to be made later, is configured as an electronic parts mounting board for mounting the electronic parts, the block diagrams shown FIGS. 8A and 8B show a state before the electronic parts are mounted, and are depicted as boards having wirings buried in the interior and terminals connected to these wiring. This board, as described above, for example, is configured by plastic resin. This inner case 300 controls the heat transfer from the power module 408 to the control circuit board 404. Further, similarly to the case of the interface module 200, the heat transfer from the mechanical portion DMP can be controlled by this inner case 300, and the device existing at the outer side than the inner case 300 can be protected from the heat.

First, the inner case 300, as shown in FIG. 8A, has the outer contour approximately similar shape as the outer contour of the interface module 200, and is formed with large-diameter holes 304a, 304b, 304c, and 304d at its four corners, respectively. Any of the large-diameter holes is for fixing the electric circuit portion DCP including the inner case 300 to the mechanical portion DMP by using the bolts 700a, 700b, 700c, and 700d. Further, a portion close to the two large-diameter holes 304a and 304b from among the four large-diameter holes is formed with holes 308a and 308b inserted with the protrusion poles 208a and 208b which are formed in the interface module 200.

Further, between the peripheral portion of the inner case 300 including a portion in which the large-diameter holes 304a, 304b, 304c, and 304d are formed, and the center portion slightly reaching the inner side from this peripheral portion, a step portion 310 is formed, and is in a state in which a recess portion is formed in the center portion. This recess portion is for forming a space portion to allow a control circuit board 404 and the like to be described later to be disposed between the interface module 200 and the recess portion.

In the peripheral portion which becomes thicker than the center portion by the step portion 310, a groove 302a is formed so as to dispose the large-diameter holes 304a, 304b, 304c, and 304d at the outside, and moreover, to surround the center portion except for the peripheral portion, and this groove 302a is fitted with the seal 302 (not illustrated). This is for the purpose of interposing the seal 302 in the boundary surface between the interface module 200 and the inner case 300 so that the infiltration of the moisture and foreign matters passing through the boundary surface can be prevented when the inner case 300 is abutted and disposed on the interface module 200.

The inner case 300 is formed with a relatively large oblong through hole 306 at a position slightly shifted from the center portion. This through hole 306 is a place in which a power module 408 to be described later is disposed.

Therefore, an electrode (terminal) formed by protruding from the power module 408 to the two sides, respectively which are in an opposite side relationship from among each periphery of this through hole 306 and, for example, a terminal TMA10 electrically connected by welding are juxtaposed and formed. Further, a place positioned relatively far away from the through hole 306 and equivalent to the rear surface side of the parts mounting region EPL is formed with a terminal TMA20. A portion adjacent to the portion in which this terminal TMA20 is formed is disposed with relatively small electronic parts, and its electrode is electrically connected to the terminal TMA20.

Further, from among the peripheries of the through hole 306, one portion from the two sides, which are in the remaining opposite side relationship except for the portion in which the terminal TMA10 is juxtaposed, is formed with through holes 310a and 310b. These through holes 310a and 310b are used as screw holes when fixing the inner case 300 and the power module 408 to the outer case 500.

Further, when this inner case 300 is opposed to the interface module 200 and is disposed at a fixed position, a terminal hole group of THG14 and THG15 into which the bifurcate terminals Tmi14 and Tmi16 formed in the interface module 200 are inserted, respectively, and a terminal group of THG10 and THG18 into which the bifurcate terminals Tmi10 and Tmi18 are inserted, respectively are formed, and each of these terminal holes are built-in with terminals abutted on bifurcate portions of each bifurcate terminal.

Further, when this inner case 300 is opposed to the interface module 200 and is disposed at a fixed position, a through hole THA12 into which the terminal TMI'12 formed in the interface module 200 is inserted is formed, and through this through hole THA12, the top end of the terminal TMI'12 is protruded to the external surface of the inner case 300. Further, the through hole THA12 is formed large enough to the extent of having a sufficient gap around the terminal TMI'12 inserted therein. This is for the purpose of allowing these respective through holes THA12 to function as air nozzles inside the electro mechanical brake apparatus, and performing pressure adjustment allowed to follow the change of the outside air, while preventing the infiltration of the moisture into the electro mechanical brake apparatus BR.

The external side surface of the inner case 300, as shown in FIG. 8B, is provided with the parts mounting region EPL on the surface opposite the side formed with the through hole 306 from among the region substantially split in two in the surface, and this parts mounting region EPL is formed so as to be surrounded by the wall portion 305.

In this manner, in the parts mounting region EPL surrounded by the wall portion 305, for example, the place in which the electronic parts such as capacitor are disposed is set in advance as the recess portion DNT1 matching the shape of the electronic parts, and close to that place, the terminal TMC20 is provided and formed to be connected to electrodes of the electronic parts. This is for the purpose of disposing each electronic part at its fixed position, and electrically connecting each part to the wiring layer buried in the inner case 300 without mistake through the terminal TMC20 formed close to the electronic parts.

Further, as the wiring layer, together with a wiring laying having a relatively thin wire width for performing transmission and reception of the signals, a wiring layer (power system bus) having a large wire width supplied with the power source which becomes a high voltage is formed, and this wiring layer is connected with a terminal (not illustrated) to be electrically connected to the terminal TMI'12 protruded through the through hole THA12. Incidentally, the connection of this terminal and the terminal TMI'12 will be described later.

Incidentally, as shown in FIGS. 10A to 10D, in a portion which is a wall portion 305 formed by surrounding the parts mounting region EPL and opposing to the through hole 306, the thickness itself of the wall portion 305 is made thicker, and in its center, a protruded wall portion 305a provided with a through hole 305b which is penetrated from the through hole 306 side to the part mounting region EPL is formed. This protruded wall portion 305a, as will be clarified by the description to be made later, has functions to fix the top end portion of the harness 600 and guide each wiring inside the harness 600 to the parts mounting region EPL through the through hole 305b.

(Outer Case 500)

Further, FIGS. 9A and 9B are views showing a detailed configuration of the outer case 500, and FIG. 9A is an oblique view seen from the surface (inner side surface) of the side disposed opposite the inner case 300, and FIG. 9B is a perspective view seen from the surface (outer side surface) of the side disposed opposite the inner case 300.

The outer case 500, for example, is configured by a metal comprising aluminum alloy treated with alumite processing on the surface. As will be clarified by the description to be made later, this outer case 500 is abutted and fixed on the power module 408. This is for the purpose of making the heat dissipation characteristic favorable through the outer case 500. Further, this is for the purpose of increasing a mechanical strength since the harness 600 is fixed. Further, since the outer case 500 occupies a relatively large surface area as a housing of the electric circuit portion DCP, damages due to external obstacles (for example, stepping-stone) are prevented.

First, in the outer case 500, its outer contour has approximately the same shape as the outer contour of the inner case 300, and at each of its four corners, large-diameter holes 512a, 512b, 512c, and 512d are formed. This is for the purpose of fixing the electric circuit portion DCP including this outer case 500 to the mechanical portion DMP through any of these holes by using the bolts 700a, 700b, 700c, and 700d.

The surface of the lower portion side except for an opening portion 504 of the inner side surface of the outer case 500 as shown in FIG. 9A is formed with approximately oblong groove 502a. As will be clarified by the description to be made later, this is for the purpose of burying the seal 502 (not illustrated) in the groove 502a. Further, inside the region surrounded by the groove 502a, screw holes 510a and 510b for fixing the power module 408 to be described later are formed. Further, screw holes 511a and 511b close to these screw holes 510a and 510b, respectively and disposed outside are formed. The groove 502a, to position these screw holes 511a and 511b inside, is formed as a detouring pattern at the places of the screws holes 511a and 511b. These screw holes 511a and 511b are in a coaxially disposed relationship with the screw holes 310a and 310b of the inner case 300 shown in FIG. 8, and the fixing of the outer case 500 to the inner case 300 is performed by the screws 320a and 320b (see FIG. 11D) to be described later.

Further, the other surface except for the opening portion 504 in the outer side surface of the outer case 500 shown in FIG. 9B is formed with a harness fixing portion 506. This harness fixing portion 506 fixes the harness 600 (not illustrated) together with the unillustrated harness stopper 602. The harness fixing portion 506 is configured such that the groove 506a is formed in a direction oriented to the opening portion 504 side in the center of a protruded base portion. Further, the harness fixing portion 506 is formed with screw holes 507a and 507b for fixing the harness stopper 602 at both sides sandwiching the groove 506a.

Incidentally, close to this harness fixing portion 506, for example, four pieces of projected bodies 508 are formed, and by these members, an attempt is made to enlarge the surface area of the outer case 500, thereby to increase a heat dissipation effect.

The opening portion 504 of the outer case 500, in its periphery, is provided and formed with a wall portion 505 which is abutted and disposed on the wall portion 305 outward of the wall portion 305 of the inner case 300. This is for the purpose of allowing the opening portion 504 together with the wall portion 305 of the inner case 300 to function as an outer frame of the parts mounting region EPL, and at the same time, attempting to improve the mechanical strength thereof.

Further, the portion which is the wall portion 305 and opposing the harness fixing portion 506 is configured to have a bridge 505a whose upper end is coupled and has an opening portion 505b. When the outer case 500 is fitted to the inner case 300, the protruded wall portion 305a of the inner case 300 is positioned inside the opening portion 505b of the wall portion 505 of the outer case 500, and moreover, the bridge 505a covers the peripheral side surface of the protruded wall portion 305a.

In the outer side surface of the outer case 500, a part of the periphery of the wall portion 505 is formed with screw holes 512a, 512b, and 512c for screwing the cover 800.

(Harness 600)

The harness 600 is a wiring cable for supplying the signal of the higher-level control device ECU (1) and the power source from the battery VT to the electronic parts mounting board. The harness 600, for example, is formed by bundling and containing a plurality of wirings in a tube-like outer cover.

The harness 600 is configured such that a top end portion connected to the protruded wall portion 305a of the inner case 300 is provided with a flange 606. The flange 606 has an outer cover of the harness 600 fixed and fitted to a through hole formed in its center, and each wiring 608 inside the outer cover is pulled outside through the through hole of the flange 606 (see FIGS. 12A to 12E).

(Cover 800)

The parts mounting region EPL exposed from the opening portion of the outer case 500 is blocked by the cover 800 (see FIG. 14I). This cover 800, for example, is configured by metal comprising aluminum alloy treated with alumite processing on the surface. This cover 800 is fitted to the outer case 500, and therefore, similarly to the outer case 500, is good in heat dissipation characteristic. This is for the purpose of preventing damages due to external obstacles (for example, stepping-stone) since the outer case 500 occupies a relatively large surface area as a housing of the electric circuit portion DCP.

As shown in FIG. 1, the cover 800 has, for example, three tongue portions protruded from its periphery, and a screw penetration hole is formed in the tongue portion. When the cover 800 is fitted to the outer case 500, the fitting is made by screws which are inserted into the screw penetration hole and screwed into the outer case 500. Further, the cover 800 is abutted and positioned on the wall portion 305 of the inner case 300, so that the cover 800 and the inner case 300 can be put into an engaged state. As a result, air-tightness inside the inner case 300 can be secured.

Further, a step portion 800a comprising an annular protrusion traveling the periphery of the inner side surface of the cover 800 is formed. This step portion 800a, when allowing the cover 800 to be disposed at a fixed position of the outer case 500, is abutted and positioned on the inner side surface of the wall portion 505 of the outer case 500. As a result, the cover 800 is put into an engaged state with the outer case 500, so that a positioning of the cover 800 for the outer case 500 can be performed.

<<Assembling of Electro Mechanical Brake Apparatus BR>>

One embodiment of the process in the assembling of the dynamo-electric brake apparatus BR comprising each of the above described components will be described below.

<<Mounting of Electronic Parts to Inner Case 300 and Assembling of Outer Case 500>>

FIGS. 10A to 10D are views showing a process in which the electronic parts are mounted in the inner case 300, and the electronic parts and the wirings inside the inner case 300 are electrically connected, and after that, the outer case 500 is fitted.

First, as shown in FIG. 10A, the inner case 300 is prepared. As described above, in the outer side surface of the inner case 300, the parts mounting region EPL surrounded by the wall portion 305 is formed. This parts mounting region EPL, for example, is mounted with electronic parts such as a capacitor or a reactance, and at the bottom of the region, the recess portion DNT1' for positioning each electronic part at its fixed position is formed when each electronic part is disposed.

Further, from among the wall portions 305, in the center portion of the portion side formed with the through hole 306, the protruded wall portion 305a having a relatively large thickness is integrally formed with the wall portion 305. This protruded wall portion 305a fixes the flange 606 fitted to the top end of the harness 600 to be described later, and moreover, has a function to guide each wiring 608 inside the harness 600 to the parts mounting region EPL.

Hence, the protruded wall portion 305a is formed with a through hole 305b, and at the same time, both sides of the through hole 305b are formed with screw holes 305c and 305d for fixing the flange 606 of the harness 600.

Incidentally, in the periphery of the through hole 305b, a ring-shaped seal 305S is disposed so as to surround the through hole 305b. When the flange 606 of the harness 600 to be described later is abutted and disposed on the protruded wall portion 305a, this is for the purpose of preventing the infiltration of the moisture and foreign matters from the boundary surface between the protruded wall portion 305a and the flange 606.

As shown in FIG. 10B, the recess portion DNT1' of the parts mounting region EPL is disposed with predetermined electronic parts EP1, EP2, EP3, and EP4, and the terminals TM10 provided close to these electronic parts EP1, EP2, EP3, and EP4, and terminals to be connected with these electronic parts are mutually electrically connected, for example, by welding.

Next, as shown in FIG. 10C, the outer case 500 is prepared. This outer case, as described above, has the seal 502 disposed inside the groove 502a formed on the surface opposing the inner case 300. When this seal 502 fits the outer case 500 into the inner case 300, it is disposed so as to surround the periphery of the through hole 306 of the inner case 300.

As shown in FIG. 10D, the outer case 500 is fitted into the inner case 300. The outer case 500 allows the parts mounting region EPL of the inner case 300 to be exposed by its opening 504, and is fitted into the inner case 300 so as to cover the other regions. That is, the wall portion 505 of the outer case 500 is disposed so as to be positioned at the outer wall surface side of the wall portion 305 of the inner case 300, and at this time, the protruded wall portion 305a of the inner case 300 is disposed so as to be surrounded by a bridge 505a formed in the wall portion 505 of the outer case 500, and at the same time, the surface at a harness fixing base 506 side of the protruded wall portion 305a is approximately flush with the surface at the harness fixing base 506 side of the wall portion 505 of the outer case 500.

FIGS. 11A to 11D are views showing a mounting process of the electronic parts on the inner side surface of the inner case 300 when mounting the electronic parts on the inner case 300 and assembling the outer case 500.

FIGS. 11A and 11B are views depicted corresponding to each process in FIGS. 10A to 10D, respectively where the inner case 300 is prepared (FIG. 11A), the electronic parts are mounted (FIG. 11B), the outer case 500 is fitted (FIG. 11C), and the inner case 300 and the outer case 500 are integrated (FIG. 11D).

As shown in FIG. 11A, the inner case 300, as described above, for example, has the wiring (not illustrated) buried, and in the places where the wirings are required, for example, the terminal TMA10 and TMA20 are formed. The terminal TMA10 is formed in a part of the periphery of the through hole 306 of the inner case 300. This is because, in the portion of this through hole 306, the power module 408 is disposed, and electrical connection between the terminal of this power module 408 and the terminal TMA10 is attempted. Further, the terminal TMA20 is formed at a place (equivalent to the rear surface side of the parts mounting region EPL) positioned relatively away from the through hole 306, and in the next process, the electronic parts are connected to and mounted on the terminal TMA20.

Next, as shown in FIG. 11B, when the electronic parts EP1, EP2, EP3, and EP4 such as a capacitor or a reactance are mounted in the outer side surface of the inner case 300, the relatively small electronic parts EP6 and EP7 are disposed also in the inner side surface of the inner case 300, and the terminal thereof and the terminal TMA20 disposed close to this terminal are connected, for example, by welding.

FIG. 11C is a view showing a state in which the outer case 500 is fitted into the inner case 300, and the through hole 306 formed in the inner case 300 is blocked by the outer case 500.

As shown in FIG. 11D, the fixing of the outer case 500 to the inner case 300 is performed by screws 320a and 320b screwed into the outer case 500 from the inner side surface of the inner case 300 through the screw holes 310a and 310b. These screws 320a and 320b are screwed into the screw holes 511a and 511b (see FIG. 9A) formed in the outer case 500. Such a fixing of the outer case 500 to the inner case 300 makes the fitting of the harness 600 (to be described next) and the connection by welding and the like between the harness 600 and the electronic parts in the parts mounting region EPL easy.

(Fitting of Harness 600)

FIGS. 12A to 12D are views showing a process in which the harness 600 is fitted to an electronic parts mounting board 900 comprising a combination of the inner case 300 and the outer case 500.

Figure 12A:
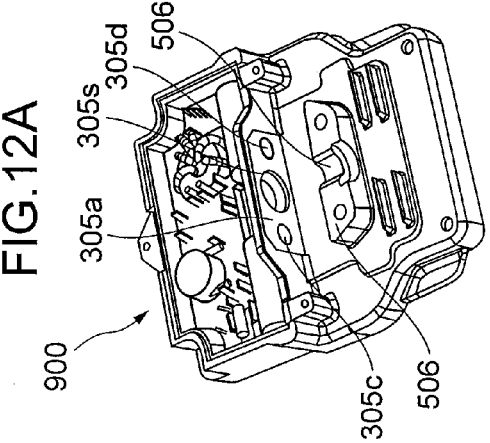
FIGS. 12A to 12E are process drawings showing one embodiment when fitting a harness in the manufacture of the electro mechanical brake apparatus according to the present invention.

First, as shown in FIG. 12A, the electronic parts mounting board 900 is prepared. This electronic parts mounting board 900, as described above, has an annular seal 305s formed so as to surround the periphery of the through hole 305b in the protruded wall portion 305a formed in the inner case 300.

Figure 12B:
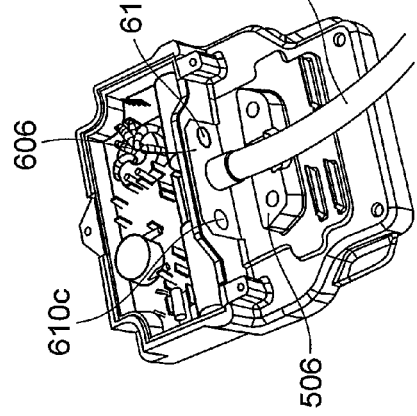

Next, as shown in FIG. 12B, the harness 600 is disposed at the fixed position of the electronic parts mounting board 900.

The harness 600 has its flange 606 abutted and disposed on the protruded wall portion 305a, and screw holes 610c and 610d formed by sandwiching the through hole (not illustrated) of the flange and the through hole are opposed with respective center axes matched to the corresponding through holes 305b of the protruded wall portion 305a and screw holes 305c and 305d. Further, the harness 600 is disposed inside the groove 506a of the harness fixing portion 506 formed in the outer case 500 in the place slightly isolated from the end portion (top end portion) at the flange 606 side. This grove 506a controls the movement in a direction to cross the longitudinal direction of the harness 600. Hence, at the stage of having disposed the harness 600 in the groove 506a of the harness fixing portion 506, the positioning of the flange 606 to the protruded wall portion 305a is performed.

Figure 12C:
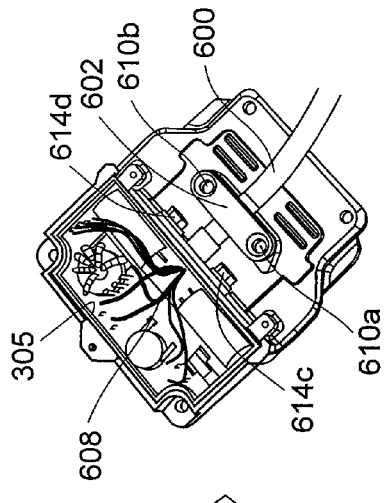

Next, as shown in FIG. 12C, the flange 606 of the harness 600 is fixed to the protruded wall portion 305a of the inner case 300 by using bolts 614c and 614d. The bolt 614c and 614d are screwed into the corresponding screws holes 305c and 305d of the protruded wall portion 305a from the screw holes 610c and 610d of the flange 606. In this case, the flange 606 of the harness 600 is stuck fast to the protruded wall portion 305a through the seal 305s, and by this seal 305s, the moisture can be prevented from infiltrating into the parts mounting region EPL inside the wall portion 305 through the boundary surface between the protruded wall portion 305a and the flange 606.

In FIG. 12C, over the harness fixing portion 506 of the outer case 500, a harness stopper 602 is mounted so as to hold the harness 600. This is for the purpose of fixing the harness stopper 602 to the harness fixing portion 506 in the next process. The harness stopper 602, for example, comprises the shape of an approximately flat plate mounted in the harness fixing portion 506 so as to straddle the harness 600, and screw holes 610a and 610b are formed at each of both end portions with the harness 600 sandwiched therebetween.

Figure 12D:
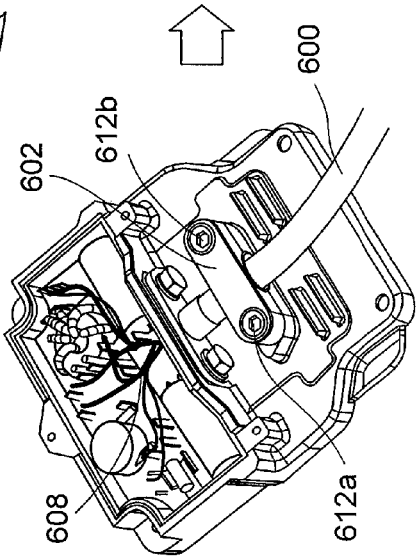

Next, as shown in FIG. 12D, the harness stopper 602 is fixed to the harness fixing portion 506 by using bolts 612a and 612b. The bolts 612a and 612b are screwed and fixed into the corresponding screw holes of the harness fixing portion 506 from the screw holes 610a and 610b of the harness stopper 602. As a result, the harness 600 is sandwiched between the harness fixing portion 506 and the harness stopper 602, and by a depressing force by this sandwiching, the movement in its axial direction is controlled.

Figure 12E:
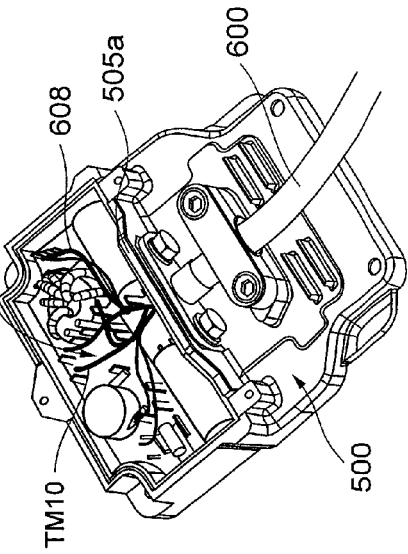

As shown in FIG. 12E, each of the wirings 608 pulled out to the parts mounting region EPL inside the wall portion 305 of the inner case 300 from the harness 600 are connected to each of the terminals TM10, for example, by welding. As described above, the inner case 300 is buried with, for example, the wiring layers, and the terminals TM10 provided in the midst of the wiring layers are protruded and formed on the upper surface of the parts mounting region EPL.

Incidentally, the pulling out of the harness 600 fitted to the outer case 500 from the device main body in this manner can be performed with the harness once allowed to extend in the vertical direction, and after that, allowed to extend in a free direction to the movement of the caliper. This allows the harness 600 always to have an allowance so that the routing of the harness 600 can be performed in the situation accompanied with the movement of the caliper. As a result, the harness 600 can be prevented from being given a tension state accompanied with the breaking of wiring.

In the above described embodiment, in the configuration where each wiring 608 of the harness 600 is pulled out into the inside of the wall portion 305 of the inner case 300, the top end of the harness 600 is fixed to the wall portion 305 (protruded wall portion 305a) of the inner case 300 through the flange 606. However, in place of the flange 600, a connector may be used. As the connector, for example, a pair of connectors electrically connected detachably attachable is used. The one connector is fixed and fitted to, for example, the wall portion 305 of the inner case 300, and the wiring connected to each terminal of the one connector is pulled out into the parts mounting region EPL inside the wall portion 305, and is connected to the corresponding terminal. The other connector is fitted to the top end of the harness 600, and each wiring of the harness 600 is connected to the terminal of the other connector. Even by doing so, the engagement of the other connector with the one connector allows the same effect shown in FIG. 12 to be obtained.

(Fitting of Power Module 408 and the Like to Inner Case 300)

FIGS. 13A to 13D are views showing a process when the power module 408, metal plate 402, and control circuit board 404 are fitted to the inner case 300.

First, as shown in FIG. 13A, the electronic parts mounting board 900 fitted with the harness 600 is prepared. Then, the power module 408 is disposed on the portion of the through hole 306 of the inner side surface, and is fixed by the screws 410a and 410b inserted into screw holes 510a and 510b (not illustrated) formed on the outer case 500 through the through holes (not illustrated) formed in the power module 408.

Incidentally, the configuration of the rear surface of the inner case 300 before mounting this power module 408 is as shown in FIG. 11D, and the through hole 306 of the inner case 300 blocked by the outer case 500 is formed as the recess portion, and in this recess portion, the power module 408 is stored.

In this case, a portion equivalent to the bottom of the recess portion is a portion of the outer case 500 covered by a metal, and the power module 408 is disposed so as to contact the outer case 500. This is for the purpose of dissipating the heat from the power module 408 through the outer case 500. Although not illustrated, between the outer case 500 and the power module 408, heat dissipation grease or a heat dissipation sheet is interposed, so that an efficiency of heat conduction from the power module 408 to the outer case 500 is improved.

Further, at the side surface of this power module 408, terminals serving as electrodes of the power module 408 are protruded, and when the power module 408 is disposed at the fixed position on the inner case 300, the terminals TMA10 to be connected to the above described terminals are exposed and formed on the inner case 300 surface. This terminal TMA10 is connected to the wiring layer buried, for example, in the inner case 300. The terminal of the power module 408 and the terminal on the surface of the inner case 300 are mutually electrically connected, for example, by welding.

Next, as shown in FIG. 13B, an insulating sheet 400 is disposed on the upper surface (surface at the interface module 200 side) of the power module 408.

This insulating sheet 400 is interposed in a space with the metal plate 402 in order to attempt electrical insulation between each terminal portion of the power module 408 and the metal plate 402 to be described next. As the material of the insulating sheet 400, for example, polyimide resin is used, and as a result, the insulating sheet 400 has a heat resistance of not less than 150° C., and moreover, comes to have an insulation of 200 kV/mm. Further, the insulating sheet 400 extends to cover the terminal portion of the power module 408 so as to be adhered on the upper surface of the power module 408. Incidentally, the insulating sheet 400 is formed as a pattern having a notch 400a, which does not cover the head portions of the screws 410a and 410b fixing the power module 408 to the outer case 500, but avoids the head portions.

Next, as shown in FIG. 13C, the upper surface (surface at the interface module 200 side) of the insulating sheet 400 is disposed with a metal plate 402 comprising, for example, an aluminum plate. This metal plate 402 is disposed by avoiding to contact the terminal of the power module 408 by the insulating sheet 400. This metal plate 402 is for the purpose of achieving an effect of mechanically reinforcing the control circuit board 404 disposed on this upper surface (surface at the interface module 200 side) and an effect of dissipating the heat from the control circuit board 404. Further, this metal plate 402 has a size to sufficiently cover both of the power module 408 and the insulating sheet 400, and allows the head portions of the fixing screws 410a and 410b from the through holes 408a and 408b formed in the metal plate 402 toward the outer case 500 of the power module 408 to expose without protruding from the through holes 408a and 408b. By the through holes 408a and 408b of this metal plate 402, the metal plate 402 can be stuck fast to and disposed on the insulating sheet 400, and moreover, can allow the control circuit board 404 to be described later to be stuck-fast to and disposed on the upper surface of the metal plate 402.

Incidentally, this metal plate 402 has a patterned concave portion 402d in the surface opposite the control circuit board 404 to be described later. The control circuit board 404 often has inspection check terminals (not illustrated) exposed on the surface opposite the metal plate 402, and these terminals are opposed inside the forming region of the concave portion 402d of the metal plate 402, thereby to avoid direct contact with the metal plate 402. As a result, each inspection check terminal of the control circuit board 404 is prevented from being electrically connected. Further, the concave portion 402d has also the discharging function of a bonding agent when the control circuit board 404 is adhered on the upper surface of the metal plate 402 by using the bonding agent.

As shown in FIG. 13D, the control circuit board 404 is disposed on the upper surface (surface at the interface module 200 side) of the metal plate 402. The control circuit board 404 has its board formed, for example, by ceramic, and its upper surface (surface at the side opposite the metal plate 402), for example, is mounted with a relatively large electronic parts EP10. The reason why ceramic is used as the board of the control circuit board 404 is because, for example, it has heat resistance as well as vibration resistance. Since this control circuit board 404 is disposed on the upper surface of the metal plate 404, even when a distortion arises, for example, on the inner case 300 from some reasons, the distortion can be restricted to be transferred to the control circuit board 404 by the metal plate 402, so that the damage of the control circuit board 404 can be prevented.

The control circuit board 404 has the wiring layers electrically connecting each electronic part EP10 buried and formed on the board or inside the board, and terminals TM13 connected to these wiring layers are juxtaposed and formed on a portion of the periphery of the board. The inner case 300 allowing the control circuit board 404 to be disposed is associated and formed with the terminals TM13 to be connected to terminals TM12 of the control circuit board 404 in the periphery of the control circuit board 404. Each of these corresponding terminals TM12 and TM13 is mutually electrically connected by a wire bonding comprising, for example, aluminum.

The interior of the inner case 300 where each mounting of the power module 408, insulating sheet 400, metal plate 402, and control circuit board 404 is thus completed is filled up with a gelatinous member (not illustrated). This is for the purpose of alleviating the transfer of vibration to each component by this gelatinous member.

(Fitting Each Other Among Assemblies)

FIGS. 14A to 14I are views showing a process when an assembly (referred to as assembly ASA in the following description) comprising an integration of the already configured mechanical portion DMP and the interface module 200, and an assembly (referred to as assembly ASB in the following description) comprising an integration of the inner case 300, outer case 500 and harness 600 are assembled.

First, as shown in FIG. 14A, the assembly ASA and the assembly ASB are prepared. The assembly ASA is the same as that shown in FIG. 6C, and the assembly ASB is the same as that shown in FIG. 13D.

In this case, when the assembly ASA and the assembly ASB are brought into contact at each surface where they are opposed, as shown in FIG. 14A, each terminal provided at the interface module 200 side and terminals formed at the inner case side are in a relationship shown below.

First, the interface module 200 is provided with three lead terminals TMI'12 which are protruded relatively large. From among the three terminals, two terminals are mutually adjacent, and the remaining one terminal is disposed and isolated. This is for the purpose of allowing the terminal to be protruded at a predetermined place in the parts mounting region EPL of the inner case 300. These three terminals TMI'12, as shown in FIG. 14B, which is an enlarged view of the three terminals, are integrally formed with the wiring layer WL4 buried, for example, in the interface module 200, and for example, the wiring layer WL4 is bent inside the interface module 200, so that the three terminals are formed to be protruded on the surface of the interface module 200. The inner case 300 at the assembly ASB side opposing to each of these terminals TMI'12, as shown in FIG. 14C which is an enlarged view, is formed with through holes THA12 to be inserted with the terminals TMI'12, and each terminal TMI'12 is protruded up to the parts mounting region EPL formed at the surface opposite the inner case 300 through this through hole THA12. That is, each of these terminals TMI'12 is connected to the other terminal in the parts mounting region EPL.

Further, the interface module 200 of the assembly ASA is provided with a plurality of bifurcate terminals Tmi14 and Tmi16 juxtaposed and provided. These bifurcate terminals Tmi14 and Tmi16, as shown in FIG. 14D which is an enlarged view, are also integrally formed with the wiring layer buried, for example, inside the interface module 200. This wiring layer is relatively formed thin as it is in charge of transmission and reception of the signals, and is formed thick in the portion inside the interface module 200 and reaching the bifurcate terminals Tmi14 and Tmi16, and is bent at that portion, thereby to be protruded and formed on the surface of the interface module 200. The inner case 300 opposing to each of these bifurcate terminals Tmi14 and Tmi16, as shown in FIG. 14E which is an enlarged view, is formed with grooves GTT to be inserted with each of the bifurcate terminals Tmi14 and Tmi16, and at the same time, inside the grooves GTT, terminals TM30 sandwiched between each bifurcated portion of each of the corresponding bifurcate terminals Tmi14 and Tmi16 are juxtaposed and disposed. This terminal TM30 is connected to the wiring buried, for example, in the inner case 300.

As evident from these descriptions, when the assembly ASB is oppositely brought into contact with the assembly ASA and assembled, the terminal TMI'12 and the like at the interface module 200 side can be allowed to appear in the parts mounting region EPL of the inner case 300, and the bifurcate terminals Tmi14 and Tmi16 can be connected to the wirings inside the inner case 300 through the terminal.

Next, as shown in FIG. 14F, the assembly ASB is oppositely brought into contact with the assembly ASA and assembled. In this case, the protruded posts 208a and 208b protruded and formed at the interface module 200 side are inserted into holes 308a and 308b formed at the inner case 300 side, so that the assemblies ASA and ASB are positioned.

The assembly ASA and the assembly ASB are mutually connected by bolts 700a, 700b, 700c, and 700d screwed into the screw holes of the assembly ASA through the screw holes formed at the corner of the assembly ASB.

In this case, as shown in FIG. 14G where a portion of the parts mounting region EPL of the inner case 300 is enlarged, the terminals TMI'12 are protruded inside the parts mounting region EPL through the through holes THA12, and each of these terminals TMI'12 is a terminal to be electrically connected to each of the terminals TMI'12, and is mutually contiguous and opposed to the terminals TMI"12 provided in advance and formed in the inner case 300 in those surfaces (except for the side surfaces). Consequently, at this stage, the terminals TMI'12 and the terminals TMI"12 are mutually electrically connected, for example, by welding. Incidentally, FIG. 14H is a view showing a connection state, for example, between the bifurcate terminals Tmi14 of the interface module 200 side and the terminals TM30 at the inner case 300 side by assembly of the assemblies ASA and ASB, and shows that the terminals TM30 are sandwiched between each bifurcated portion of the bifurcate terminals Tmi14, and are electrically connected.

As shown in FIG. 14I, the parts mounting region EPL which is exposed is covered by the cover 800, and the cover 800 is fixed by screws 804a, 804b, and 804c screwed into the screw holes formed in the outer case 500 through the screw holes formed therein.

Thus, the assembly of the electro mechanical brake apparatus BR is completed. Here, as shown in FIG. 14I, the housing 100 comprising the metal of the mechanical portion DMP and the outer case 500 comprising the metal of the electric circuit portion DCP and the cover 800 are not mutually connected, and are configured to be mutually separated with the interface module 200 comprising synthetic resin sandwiched therebetween. That is, the conduction of the heat generated at the mechanical portion DMP side is prevented by the interface module 200, and is hard to be conducted to the outer case 500 side. This means that the heat generated inside the mechanical portion DMP is dissipated into an atmospheric air side through the housing 100 of the mechanical portion DMP, and the heat generated inside the electric circuit portion DCP is dissipated into an atmospheric air side through the outer case 500 and the cover 800 of the mechanical portion DCP, and therefore, the mechanical portion DMP and the electric circuit portion DCP can be independently configured heat-wise.

<<Cross-Section Configuration of Electric Circuit Portion>>

FIG. 15A is a cross-section by extracting the electric circuit portion, and is a view showing the cross section cut along the line a to a in the Figure in the interface module (surface at the side opposite the electric circuit portion) 200 shown in FIG. 15B. This view is equivalent to the cross sectional view of the electric circuit portion in FIG. 4.

As is evident from FIG. 15A, first, the one surface of the power module 408, for example, is disposed with the control circuit board 404 back on to the power module 408 through the metal plate 402 comprising an aluminum plate. The control circuit board 404 is provided with a circuit for controlling the circuit inside the power module 408, and has many terminals connected to the power module 408, and therefore, can make these connections easy.

Further, the control circuit board 404, for example, as described above, is formed by ceramic, and the damage due to its twisting can be prevented by the metal plate 402 abutted and disposed on the control circuit board 404.

Thus, the power module 408 abutted on the metal plate 402 in the one surface, is abutted on the outer case 500 through the heat dissipation grease or a heat dissipation sheet (these may not be interposed according to needs) in the other surface.

This outer case 500 is formed by metal (for example, aluminum alloy), and at the same time, the majority of its surface is exposed to the external air. Therefore, the outer case 500 is configured to improve the dissipation effect of heat generated by the power module 408.

Incidentally, the control circuit board 404 is mounted with a relatively large electronic part EP10 on the surface at the side opposite the metal plate 402, and the interface module 200 is formed with a recess portion DNT for avoiding the interference with the electronic part EP10. The recess portion DNT, when seeing the interface module 200 from the mechanical portion DMP, is configured as a protruded portion PRJ in the same region. In this case, though the protruded portion PRJ protrudes toward the mechanical portion DMP side, since it has a sufficient gap (air layer) with the component (for example, thrust plate) inside the mechanical portion DMP, it can avoid an interference with the component.

Further, as shown in FIG. 15A, the flat plate-like terminal TMI'12 provided in the interface module 200 protrudes and expands up to the parts mounting region EPL of the inner case 300 through the through hole THA12 formed in the inner case 12, and the other plate-like terminal to be connected to this terminal TMI'12 and the other terminal TMI"12 provided in the inner case 300 can be disposed to be mutually close and opposed. Consequently, the electrical connection of each of these terminals TMI'12 and TMI"12 by welding or the like can be made easy, and further, the main surface (except for the side surface) of each of the terminals TMI'12 and TMI"12 is allowed to be mutually connected, so that the connection thereof can be given reliability.

Further, the interface module 200 is provided with the bifurcate terminal Tmi14, and this bifurcate terminal Tmi14 is positioned inside the hole provided on the inner case 300, and the terminal TM30 disposed inside the hole is positioned so as to be sandwiched between each of the bifurcated portions of the bifurcate terminal Tmi14.

<<Pressure Adjustment Mechanism of Electro Mechanical Brake Apparatus>>

The end portion of the harness 600 connected to the electro mechanical brake apparatus, for example, is pulled out up to the higher-level control circuit ECU (1) (see FIG. 2) disposed inside the passenger compartment, so that the pressure inside the electro mechanical brake apparatus BR is adjusted so as to become approximately equal to the pressure of the outside air through the harness 600.

In other words, to prevent the moisture and foreign matters from infiltrating into the electro mechanical brake apparatus BR, the coupling of the mechanical portion DMP and the interface module 200, the coupling of the interface module 200 and the inner case 300, and the coupling of the inner case 300 and the outer case 500 are performed through the seals 202, 302, and 502, respectively, and as a result, the interior of the electric brake apparatus is avoided to become an hermetically sealed state.

That is, as shown in FIGS. 12A to 12E, the through holes TH10, TH12, TH14, and TH16 of the interface module 200 inserted and protruded with, for example, the terminals TM10, TM12, TM14, and TM16 disposed in the mechanical portion DMP are formed large so as to have a sufficient gap in the vicinity of the terminals TM10, TM12, TM14, and TM16. Further, as shown in FIG. 13A to 13D, the through hole THA12 of the inner case 300 in which the terminal TMI'12 provided in the interface module 200 is inserted and protruded is formed large so as to have a sufficient gap in the vicinity of the TMI'12.

From this, the interior of the housing 100 of the mechanical portion DMP, a space portion formed between the interface module 200 and the inner case 300, and a space portion formed between the inner case 300 and the outer case 500 (fitted with the cover 800) are connected, respectively through the through holes TH10, TH12, TH14, TH16, and the like of the interface module 200 and the through hole THA12 and the like of the inner case 300, and a space portion formed between the inner case 300 and the outer case 500 (fitted with the cover 800) is connected to the atmosphere through the gap between the wirings inside the harness 600.

Consequently, even when the vehicle runs through the place where the atmospheric pressure is low like a high mountain, the pressure inside the electro mechanical brake apparatus can follow suit.

Each of the above described embodiments may be used independently or combined. This is because the effect of each embodiment can be achieved independently or synergistically.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An electro mechanical brake apparatus comprising:
   a carrier,
   a caliper supported by the carrier, and having an external brake pad and an inner brake pad respectively pressable toward an external braking surface and an inner braking surface of a disc rotor rotating together with a wheel, a motor for generating a rotation torque, and a conversion mechanism for pressing the brake pads of the external side and inner side to the disc rotor based on the rotation torque, and
   a control circuit portion fixed to the caliper and provided with a metallic case on the one side thereof, a resinous interface module on another side thereof adjacent the caliper in which through-holes are arranged and sized to provide passage of air for pressure adjustment relative to ambient pressure while preventing water infiltration into the metallic case, and a resinous inner case disposed between the metallic case and the resinous interface module,
   wherein the metallic case has a concavity, and the resinous interface module is configured to cover the metallic case concavity to define a space in which a control board with a control circuit for controlling rotation torque of the motor and a power module having an inverter element are fitted to the inner case so as to be shielded from heat generated upon actuation of the caliper, and
   the power module is disposed in the concavity adjacent the metallic case, the metallic case has a stationary heat-dissipation surface disposed opposite an inner face of the metallic case to dissipate heat generated by the power module, the control board is disposed in the concavity adjacent the resinous interface module, a wiring arrangement for connecting the control board and the power module is buried in the resinous interface module, the power module is controlled by a control signal outputted from the circuit of the control board for controlling the motor rotation torque and, based on rotation torque generated by the motor and the conversion mechanism, the external and inner side brake pads being are operative to press against the respective braking surface of the disc rotor.

2. The electro mechanical brake apparatus according to claim 1, wherein the motor is provided with a stator provided with a three phase winding and a rotor having a permanent magnet, and a terminal of the three phase winding of the stator penetrates the resinous interface module and extends into the space created by the metallic case and the resinous interface module, and is coupled with the wirings buried in the resinous interface module in the space, and the three phase winding is electrically connected to the output terminal of the power module through the wirings.

3. An electro mechanical brake apparatus comprising:
   a carrier,
   a caliper supported by the carrier and having an external brake pad and inner brake pad respectively pressable toward an external braking surface and an inner braking surface of a disc rotor rotating together with a wheel, a motor for generating a rotation torque, and a conversion mechanism for pressing the brake pads of the external side and inner side to the disc rotor by the rotation torque, and
   a control circuit portion fixed to the caliper and provided with a metallic case having a concavity which faces the caliper and whose inner side has a resinous inner case that is provided with both a control board, having a control circuit which includes a CPU for controlling the rotation torque of the motor, and a power module having an inverter element,
   wherein the power module is disposed on one side of the inner case so that a stationary heat-dissipation surface thereof is located to dissipate heat generated by the power module on a side adjacent the metallic case, the control board is disposed on an opposite side of the inner case adjacent the caliper, and a resinous interface module is disposed at the inner side of the metallic case to shield the control circuit from heat generated by actuation of the caliper, the resinous interface module including through-holes provided and sized to provide passage of air for pressure adjustment relative to ambient pressure while preventing water infiltration into the metallic case, and
   a wiring arrangement for connection of the control board and the power module is buried in the resinous inner case such that the power module is controlled by a signal outputted from the control circuit of the control board for controlling the motor rotation torque and, based on motor rotation torque generated by the motor, the external and inner side brake pads are operative to press against the braking surface of the disc rotor by way of the conversion mechanism.

* * * * *